(12) United States Patent
Suzuki

(10) Patent No.: US 6,791,922 B2
(45) Date of Patent: Sep. 14, 2004

(54) INFORMATION RECORDING DEVICE THAT CAN RESUME RECORDING PROCESS AT CORRECT LOCATION ON RECORDING MEDIUM

(75) Inventor: Haruyuki Suzuki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 621 days.

(21) Appl. No.: 09/861,611

(22) Filed: May 22, 2001

(65) Prior Publication Data
US 2002/0012296 A1 Jan. 31, 2002

(30) Foreign Application Priority Data
May 24, 2000 (JP) ....................... 2000-153133

(51) Int. Cl.[7] .................................................. G11B 7/00
(52) U.S. Cl. ............... 369/47.3; 369/47.22; 369/53.29; 369/59.1
(58) Field of Search ................ 369/47.1, 47.11, 369/47.15, 47.22, 47.28, 47.3, 47.46, 53.1, 53.2, 53.29, 53.41, 59.1, 59.13, 59.14, 59.2, 59.23, 59.25

(56) References Cited

U.S. PATENT DOCUMENTS 5,161,137 A 11/1992 Suzuki
6,052,247 A * 4/2000 Treffers ........................ 360/48
6,108,289 A 8/2000 Hashimoto
6,172,955 B1 1/2001 Hashimoto
6,333,904 B1 12/2001 Hashimoto
6,694,339 B1 * 2/2004 Hirose et al. ................ 707/203

FOREIGN PATENT DOCUMENTS

| EP | 0 974 966 A | 1/2000 |
| EP | 1 056 090 A | 11/2000 |
| JP | 10-49990 | 2/1998 |
| JP | 11 167787 A | 6/1999 |
| JP | 2000-40302 | 2/2000 |

* cited by examiner

*Primary Examiner*—Muhammad Edun
(74) *Attorney, Agent, or Firm*—Dickstein Shapiro Morin & Oshinsky LLP

(57) ABSTRACT

An information recording device is provided. The information recording device includes an end detecting unit, a timing management unit, an encoder, and the like. In a case in which the information recording device writes data having a fixed unit length on a recording medium by dispersing and rearranging the data based on a fixed rule, the end detecting unit detects an end location of data recorded on the recording medium. The timing management unit decides a starting location on the recording medium for dispersing and rearranging data based on the end location. The encoder disperses and rearranges additional data by starting from the starting location, and writes the additional data on the recording medium continuously from the end location.

34 Claims, 14 Drawing Sheets

FIG.7A GENERAL 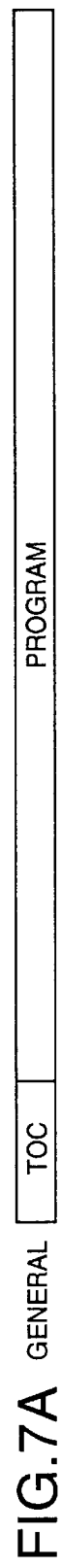
FIG.7B AUDIO 
FIG.7C DATA 

FIG.8

| TRACK NUMBER | START ADDRESS |
|---|---|
| 1 | 0 |
| 2 | 1000 |
| 3 | 3000 |
| 4 | 7000 |
| AA | 9000 |

FIG.9

| FILE NAME | START ADDRESS | SIZE |
|---|---|---|
| FILE 1 | 0 | 100 |
| FILE 2 | 100 | 400 |
| FILE 3 | 500 | 200 |

FIG.10

| ID | TRACK NUMBER | SOURCE |
|---|---|---|
| ID1 | 1 | TRACK1.WAV |
| | 2 | TRACK2.WAV |
| | 3 | TRACK3.WAV |

FIG.14

| ID | END SECTOR | END FRAME | END WORD | FINISHED |
|---|---|---|---|---|
| ID1 | 101 | 1 | 3 | 0 |
| ID2 | 7000 | 2 | 1 | 0 |
| ID3 | 300 | 1 | 1 | 0 |

INFORMATION RECORDING DEVICE THAT CAN RESUME RECORDING PROCESS AT CORRECT LOCATION ON RECORDING MEDIUM

BACKGROUND OF THE INVENTION

1. Field of the Invention

The present invention relates to an information recording device, an information recording method, a recording medium that is readable by a computer and stores an information recording program, an information recording system, an optical-disk recording device, an optical-disk recording method and an optical-disk recording system.

2. Description of the Related Art

Recently, a CD-R (CD-Recordable), on which data can be recorded once, is in common use because of its low price. The CD-R is a recording medium that stores a series of data dispersed and arranged by an interleaving process, in which the series of data must be continuous. Thus, suspension or resumption of a data recording process to the CD-R is not permitted since continuity of the interleaving process and the series of data must be insured.

Accordingly, Japanese Laid-open Patent Application No. 10-49990 suggests an optical-disk recording device that can read data continuously and correctly from an optical disk after suspending and resuming a data recording process. In detail, this optical-disk recording device acquires timing to start writing data correctly from an end of data recorded previously on the optical disk, by counting a PLL (Phase-Locked Loop) of a channel bit or a frame synchronous signal when controlling the data recording process at an ending part or a beginning part of the data recording process by use of a CIRC (Cross Interleave Read-Solomon Code) demodulation for maintaining the continuity of the data on the optical disk.

Additionally, Japanese Laid-open Patent Application No. 2000-40302 discloses an optical-disk recording device. This optical-disk recording device suspends a data recording process to an optical disk, if the optical-disk recording device decides that a buffer under-run error may occur. The buffer under-run error is an error that occurs when a buffer temporarily storing data to be recorded on the optical disk runs out of the data stored therein, and the data recording process cannot be performed. On the other hand, if it is determined that a condition in which the buffer under-run error occurs is avoided, the optical-disk recording device resumes the data recording process from a location, which is connected to the last data without any joint, the last data being recorded on the optical disk just before the suspension of the data recording process. Additionally, the optical-disk recording device records new data that continues from the last data recorded on the optical disk.

The above-described optical-disk recording device insures the continuity of the interleaving process and the series of data, and writes the series of data on the optical disk without any disconnection of data, by maintaining an interleaving circuit to a condition right after the suspension of the data recording process, and operating the interleaving circuit from the condition right after the suspension, when the resumption of the data recording process is prepared.

However, the above-described optical-disk recording device cannot secure the continuity of the interleaving process and the series of data when resuming the data recording process, if the optical-disk recording device cannot maintain the interleaving circuit to the condition right after the suspension of the data recording process.

For example, the optical-disk recording device may be powered off during the data recording process. The optical-disk recording device may also carry out hardware reset when a system down occurs to a host computer that outputs data to be recorded on the optical disk. Alternatively, a user may turn off the optical-disk recording device by interrupting the data recording process for business convenience or time convenience, or may switch the optical disk. Consequently, the condition of the interleaving circuit stored in a memory such as a RAM can be erased. In such a case, the data recording process to the optical disk cannot be resumed, and, thus, the data recorded on the optical disk cannot be reproduced completely.

SUMMARY OF THE INVENTION

Accordingly, it is a general object of the present invention to provide an information recording device, an information recording method, a recording medium that is readable by a computer and stores an information recording program, an information recording system, an optical-disk recording device, an optical-disk recording method and an optical-disk recording system.

A more particular object of the present invention is to provide an information recording device, an information recording method, a recording medium that is readable by a computer and stores an information recording program, an information recording system, an optical-disk recording device, an optical-disk recording method and an optical-disk recording system, by which a data recording process can be resumed, and data recorded on a recording medium can be completely reproduced, even if the data recording process is interrupted by power-off or hardware reset.

The above-described object of the present invention is achieved by an information recording device, including a data writing unit writing data having a fixed unit length in a recording medium, by dispersing and rearranging the data based on a fixed rule; an ending-location detecting unit detecting an ending location of the data written in the recording medium; a starting-location deciding unit deciding a starting location in the recording medium to start dispersing and rearranging the data, based on the ending location; a dispersing/rearranging unit dispersing and rearranging additional data, by starting from the starting location; and a data adding unit writing the additional data dispersed and rearranged by the dispersing/rearranging unit, continuously from the ending location in the recording medium.

The above-described information recording device can resume the data recording process even if the information recording device is powered off or reset, since the information recording device keeps track of the ending location of the data written in the recording medium, when the data recording process is interrupted. Additionally, the information recording device starts dispersing and rearranging data from a location before the ending location of the data, in which a space between the location and the ending location is enough for settling the dispersing/rearranging process. Thus, data located before and after the ending location are connected continuously, and complete reproduction of of the data is achieved.

The above-described object of the present invention is also achieved by a method of recording information in a recording medium, including the steps of writing data having a sector length in the recording medium by interleaving the data, detecting an ending location of the data written in the recording medium, deciding a location that is an interleaving length away from the ending location as a starting location for interleaving the data, interleaving additional data by starting from the starting location, and writing the additional data in the recording medium continuously from the ending location.

The above-described object of the present invention is also achieved by a recording medium readable by a computer, tangibly embodying a program of instructions executable by the computer to write data in a recording medium, wherein the program includes the steps of writing data having a fixed unit length in the recording medium, by dispersing and rearranging the data based on a fixed rule; detecting an ending location of the data written in the recording medium; deciding a starting location in the recording medium to start dispersing and rearranging the data, based on the ending location; dispersing and rearranging additional data, by starting from the starting location; writing the additional data continuously from the ending location in the recording medium; synchronizing a data-write timing to a reproducing timing of the data written in the recording medium until just before writing the additional data in the recording medium; and creating content information that indicates contents of the data written in the recording medium.

The above-described object of the present invention is also achieved by an information recording system, including an upper-level device outputting data that has a fixed unit length; and an information recording device writing the data outputted by the upper-level device in a recording medium, by dispersing and rearranging the data based on a fixed rule, wherein the information recording device includes an ending-location detecting unit detecting an ending location of the data written in the recording medium; a starting-location deciding unit deciding a starting location in the recording medium to start dispersing and rearranging the data, based on the ending location; a dispersing/rearranging unit dispersing and rearranging additional data that is outputted from the upper-level device, by starting from the starting location; and a data adding unit writing the additional data dispersed and rearranged by the dispersing/rearranging unit, continuously from the ending location in the recording medium.

The above-described object of the present invention is also achieved by an optical-disk recording device, including a data writing unit interleaving data that has a sector length, and writing the data on an optical disk by emitting laser light onto the optical disk; an ending-location detecting unit detecting an ending location of the data written on the optical disk; a starting-location deciding unit deciding a location that is an interleaving length away from the ending location as a starting location for interleaving the data; an interleaving unit interleaving additional data, by starting from the starting location; and a data adding unit writing the additional data interleaved by the interleaving unit, continuously from the ending location on the optical disk.

The above-described object of the present invention is also achieved by a method of recording information on an optical disk, including the steps of interleaving data having a sector length, writing the data on the optical disk by emitting laser light onto the optical disk, detecting an ending location of the data written on the optical disk, deciding a location that is an interleaving length away from the ending location as a starting location for interleaving the data, interleaving additional data by starting from the starting location, and writing the additional data on the optical disk continuously from the ending location.

The above-described object of the present invention is also achieved by an optical-disk recording system, including a computer outputting data that has a sector length; and an optical-disk recording device interleaving the data outputted by the computer, and, then, writing the data on an optical disk by emitting laser light onto the optical disk, wherein the optical-disk recording device includes an ending-location detecting unit detecting an ending location of the data written on the optical disk; a starting-location deciding unit deciding a location that is an interleaving length away from the ending location as a starting location for interleaving the data; an interleaving unit interleaving additional data that is outputted by the computer, by starting from the starting location; and a data adding unit writing the additional data interleaved by the interleaving unit, continuously from the ending location on the optical disk.

Other objects, features and advantages of the present invention will become more apparent from the following detailed description when read in conjunction with the accompanying drawings.

BRIEF DESCRIPTION OF THE DRAWINGS

FIGS. 7A, 7B and 7C are diagrams showing formats used for recording music data on a CD;

FIG. 8 is a diagram showing a format of a TOC (Table Of Contents) of a music disk;

FIG. 9 is a diagram showing a format of directory information;

FIG. 10 is a diagram showing a format of data ID information;

FIG. 14 is a diagram showing a format of a memory shown in FIG. 13;

DESCRIPTION OF THE PREFERRED EMBODIMENTS

A description will now be given of preferred embodiments of the present invention, with reference to the accompanying drawings.

An information recording device and an information recording method are described in a first embodiment of the present invention.

Figure 1:
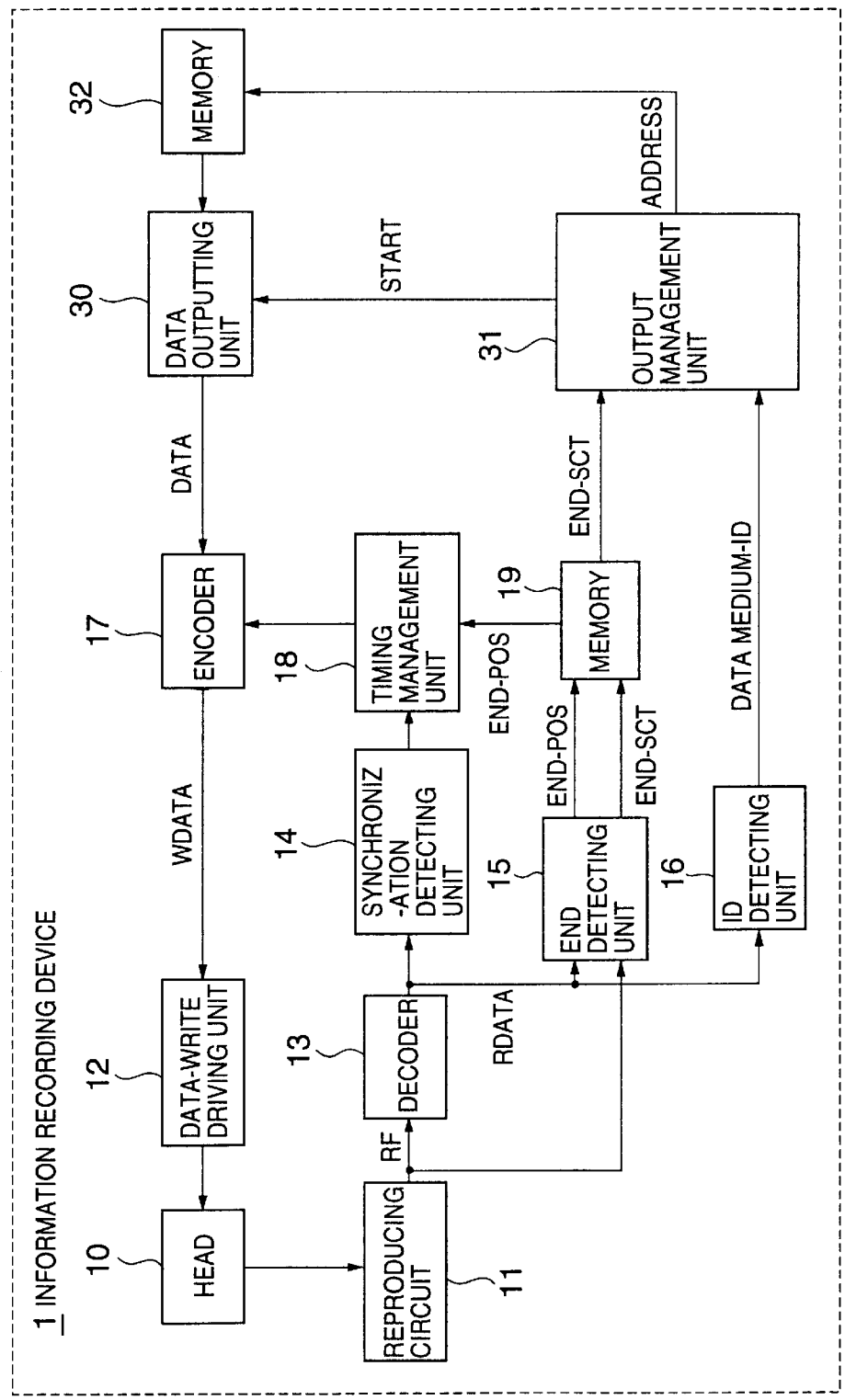
FIG. 1 is a block diagram showing a structure of an information recording device according to a first embodiment of the present invention.

FIG. 1 is a block diagram showing a structure of an information recording device 1 according to the first embodiment of the present invention. The information recording device 1 shown in FIG. 1 includes a head 10, a reproducing circuit 11, a data-write driving unit 12, a decoder 13, a synchronization detecting unit 14, an end detecting unit 15, an ID (Identification) detecting unit 16, an encoder 17, a timing management unit 18, a memory 19, a data outputting unit 30, an output management unit 31 and a memory 32.

The head 10, the data-write driving unit 12 and the encoder 17 function together as data writing means for writing data having a fixed unit length in a recording medium, by dispersing and rearranging the data based on a fixed rule. The end detecting unit 15 functions as ending-location detecting means for detecting an ending location of data recorded on the recording medium.

The synchronization detecting unit 14, the end detecting unit 15, the encoder 17 and the timing management unit 18 function together as starting-location deciding means for deciding a starting location on the recording medium to start dispersing and rearranging the data, based on the ending location detected by the ending-location detecting means.

The encoder 17 functions as dispersing/rearranging means for dispersing and rearranging additional data to be added on the recording medium, by starting from the starting location decided by the starting-location deciding means.

The head 10, the data-write driving unit 12 and the encoder 17 function together as data adding means for writing the additional data dispersed and rearranged by the dispersing/rearranging means, continuously from the ending location on the recording medium.

The synchronization detecting unit 14, the encoder 17 and the timing management unit 18 function together as synchronizing means for synchronizing a data-write timing to a reproducing timing of the data recorded on the recording medium until just before writing the additional data in the recording medium.

The ID detecting unit 16 functions as information creating means for creating content information indicating contents of the data recorded on the recording medium.

Additionally, index information and a sector length are used as the above-described content information and fixed unit length. A location that is at least an interleaving length away from the ending location is used as the starting location. An interleaving process is applied to dispersion and rearrangement based on the fixed rule.

The head 10 accesses the recording medium, and records data in or reads data from a recording area of the recording medium. The data-write driving unit 12 controls the head 10 to write data in the recording medium.

The encoder 17 takes data (DATA) supplied from the data outputting unit 30 as its input, and creates a physical data series (WDATA) by adding an error correction code to the data supplied from the data outputting unit 30, or carrying out an interleaving process or a modulation process on the data supplied from the data outputting unit 30. Subsequently, the encoder 17 outputs the data series (WDATA) to the data-write driving unit 12. The above-described interleaving process is a data dispersing/rearranging process performed at the time of recording the data on the recording medium.

A detailed description will be given of the interleaving process with reference to FIGS. 2A through 2F. FIGS. 2A through 2F are diagrams showing a data format used for the interleaving process performed by the information recording device 1. Data forms one frame for each four words, in which one word has an eight-bit length, for instance. Four frames of the data form one sector. The one sector is a minimum unit for the data to be recorded on the recording medium. As shown above, the number of units is reduced for simplifying a description.

Figure 2:
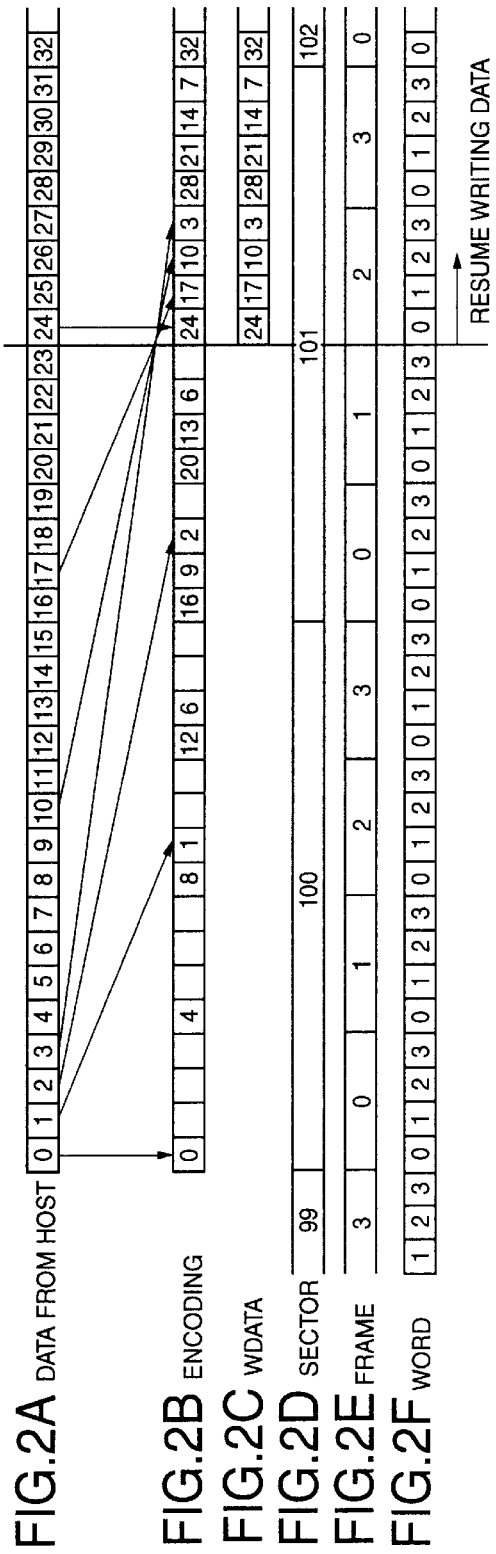
FIGS. 2A through 2F are diagrams showing data formats used for an interleaving process performed by the information recording device according to the first embodiment.

According to the interleaving process, an input data series (DATA FROM HOST) shown in FIG. 2A is separated by each frame, and data inside each frame is delayed by following the fixed rule. Consequently, an output data series "ENCODING" is dispersed on the recording area of the recording medium. It should be noted that numerical values (0–32) included in the data series "DATA FROM HOST", "ENCODING" and "WDATA" respectively shown in FIGS. 2A, 2B and 2C indicate an original order of data items (words) included the input data series "DATA FROM HOST".

If the data format shown in FIGS. 2D, 2E and 2F is used for the interleaving process, a delay amount D[i] given for a word W[i] (i=0, 1, 2, 3) in a frame is 2×i frames. Additionally, a word order WD[i] of a data item (word) included in the input data series "DATA FROM HOST" after rearrangement is 2×i×4+i word. Consequently, the input data series "DATA FROM HOST" shown in FIG. 2A is rearranged as the output data series "ENCODING" shown in FIG. 2B, by following arrows. For example, a data item [0] in the input data series "DATA FROM HOST" is rearranged to a 0'th place in the output data series "ENCODING". Similarly, a data item [1], a data item [2] and a data item [3] are rearranged to a ninth place, an eighteenth place, and a twenty-seventh place in the output data series "ENCODING".

The maximum delay with respect to an original data location in the input data series "DATA FROM HOST" is six frames (2×3) after the rearrangement, and is called a maximum interleaving length or an interleaving length. Even if errors exist continuously in a data series on a physical medium, the errors are dispersed, by carrying out the above-described interleaving process on the data series at the time of recording the data series. Thus, the dispersed errors can fit in a range of a correction ability of an error correction code, and error correction can be easily done on the dispersed errors.

Even if errors exist in two adjacent frames after the rearrangement of the data having the format shown in FIGS. 2D through 2F, each frame includes only one word error by focusing on the frame before the rearrangement. In a case in which a correction code that can fix one word error is included in each frame before the rearrangement, the one word error in each frame can be completely fixed by the correction code. For example, even if each of words 24, 17, 10, 3, 28, 21, 14 and 7 included in the data after the rearrangement is an error, as shown in FIG. 2B, each of the words corresponds to one word error in its corresponding frame of the data before the rearrangement.

In the interleaving process, an output data series is not defined unless data having a certain length is inputted as an input data series to the information recording device 1. Data items located in front of the data item [0] are supposed to fit in empty spaces of the output data series "ENCODING" shown in FIG. 2B. If the data items are inputted to the information recording device 1 by starting from the data item [0], the empty spaces become indefinite. In other words, the data items must be inputted to the information recording device 1 by starting from a data item located at least the maximum interleaving length (six frames) ahead of the data item [0], in order to define a physical data series on the recording medium.

The description will be further given of the information recording device 1 according to the first embodiment.

The reproducing circuit 11 shown in FIG. 1 is composed of a waveform equalizer, an amplifier and the like, and detects a reproduction signal supplied from the head 10. An output signal of the reproducing circuit 11 is often called an RF (Radio Frequency) signal, since the output signal is generally a high-frequency analog signal modulated by recording data.

The decoder 13 takes the RF signal as an input, and digitalizes an analog waveform of the RF signal by using a waveform shaping circuit. Subsequently, the decoder 13 takes bit synchronization by using a PLL (Phase-Locked Loop) circuit, and demodulates data by using a data demodulator to output demodulated data RDATA.

Figure 3:
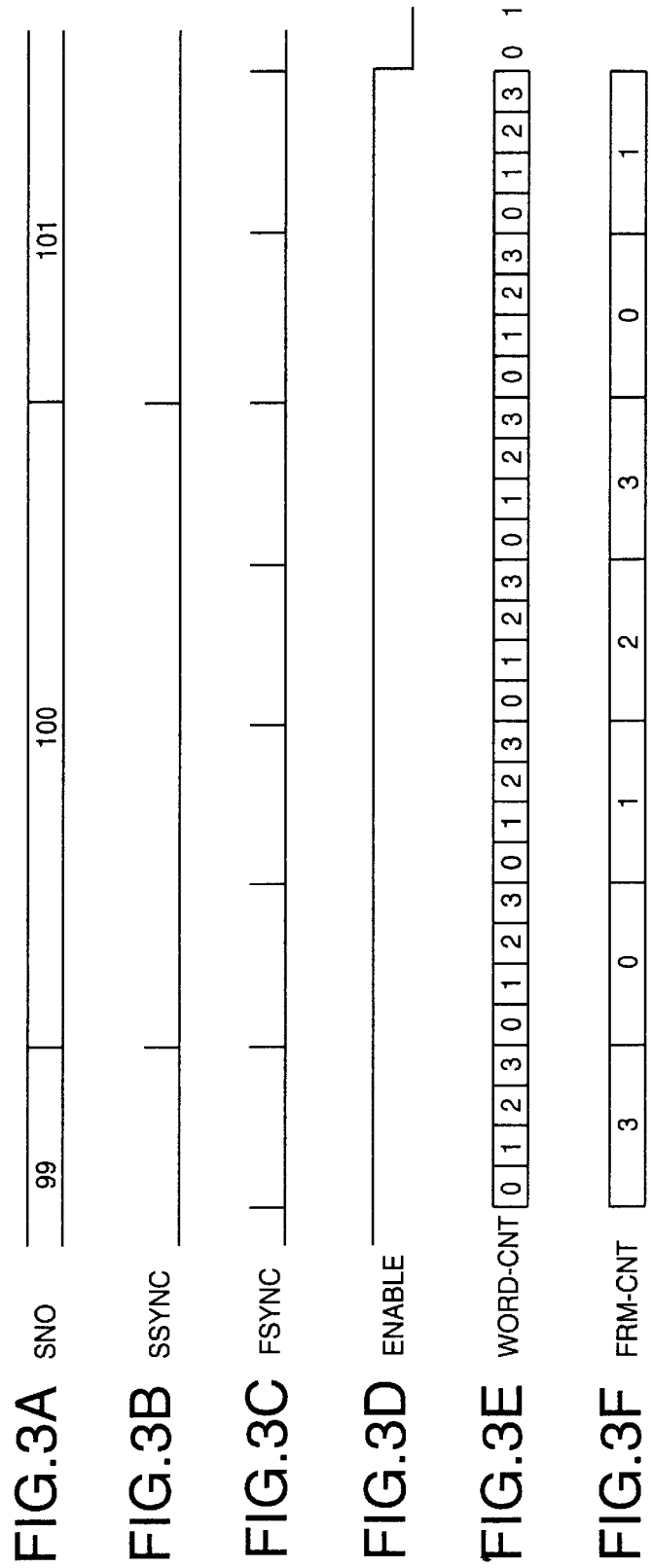
FIGS. 3A through 3F are diagrams showing data formats used for an end detecting process performed by an end detecting unit shown in FIG. 1.

The synchronization detecting unit 14 distinguishes divided parts of reproduced data, after receiving a demodulation result (RDATA) from the decoder 13. For example, the synchronization detecting unit 14 outputs a synchronous pulse at an end part of a sector, a frame or a word. Additionally, the synchronization detecting unit 14 detects a sector number corresponding to an address of the sector. Additionally, the synchronization detecting unit 14 outputs information and pulses such as a sector number SNO (99, 100, 101), a sector synchronous signal SSYNC, and a frame synchronous signal FSYNC respectively shown in FIGS. 3A, 3B and 3C, for instance.

The end detecting unit 15 detects an end part of the data recorded on the recording medium. In detail, the end detecting unit 15 detects a word number, a frame number and a sector number of the last data recorded on the recording medium.

Figure 4:
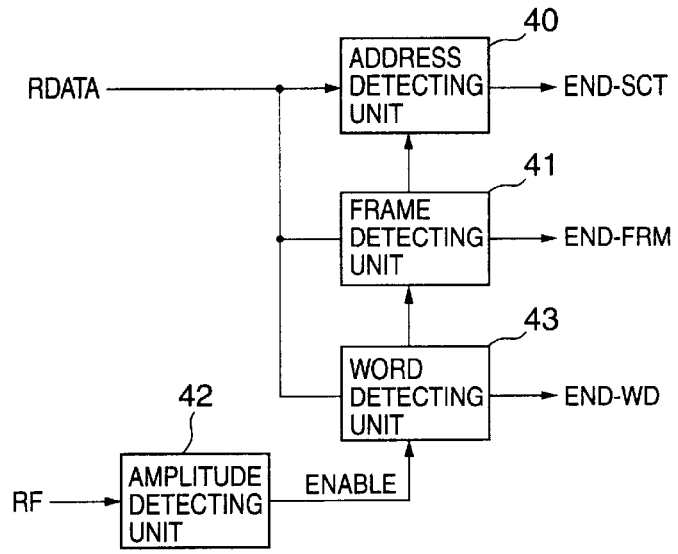
FIG. 4 is a block diagram showing an internal structure of the end detecting unit.

A description will now be given of an end detecting process performed by the end detecting unit 15, with reference to FIGS. 3A through 3F and 4. The end detecting unit 15 includes an address detecting unit 40, a frame detecting unit 41, an amplitude detecting unit 42 and a word detecting unit 43, as shown in FIG. 4. The end detecting unit 15 receives the demodulated data RDATA from the decoder 13, and inputs the demodulated data RDATA to the address detecting unit 40, the frame detecting unit 41 and the word detecting unit 43. In addition, the end detecting unit 15 receives the RF signal (an analog reproducing signal) from the reproducing circuit 11, and inputs the RF signal to the amplitude detecting unit 42.

The address detecting unit 40, the frame detecting unit 41 and the word detecting unit 43 detect a sector address of a sector, a frame number (0, 1, 2 or 3) of a frame in the sector, and a word number (0, 1, 2 or 3) in the frame, respectively, from the demodulated data RDATA. The amplitude detecting unit 42 sets a threshold to amplitude of the RF signal. If the amplitude of the RF signal exceeds the threshold, the amplitude detecting unit 42 activates a detection-permitting signal ENABLE. The amplitude detecting unit 42, then, outputs the ENABLE signal to the address detecting unit 40, the frame detecting unit 41 and the word detecting unit 43, thereby permitting the address detecting unit 40, the frame detecting unit 41 and the word detecting unit 43 to detect the sector address, the frame number and the word number, respectively.

Accordingly, the address detecting unit 40, the frame detecting unit 41 and the word detecting unit 43 keep detecting the sector address, the frame number and the word number, respectively, while the recording data exists. On the other hand, the address detecting unit 40, the frame detecting unit 41 and the word detecting unit 43 are prohibited to detect the sector address, the frame number and the word number, respectively, when the recording data reaches the end part thereof. Consequently, the sector address, the frame number and the word number are not updated, and are obtained as end information END-SCT, END-FRM and END-WD, respectively.

For example, the diagrams shown in FIGS. 3A through 3F indicate that the data recorded on the recording medium ends at a sector address 101, a frame number 1 and a word number 3. Meanwhile, the ENABLE signal becomes inactive, and the sector address 101, the frame number 1 and the word number 3 are stored as the end information (END-SCT=101, END-FRM=1, END-WD=3).

The description will be further given of the information recording device 1 according to the first embodiment. The memory 19 shown in FIG. 1 stores the end information detected by the end detecting unit 15, and supplies at least the end sector information END-SCT to the output management unit 31. Information about the end sector may be the end sector 101 itself. However, the information is preferably the sector 99 that includes physical data located at least the interleaving length (six frames) ahead of the ending location. Alternatively, the information may be the end sector 101 that includes a location following the ending location, from which the next data recording starts, or the sector 100 that includes physical data located at least the interleaving length (six frames) ahead of the location.

Setting of the end information is a selective item for designing the information recording device 1, and it is preferably predetermined to calculate an appropriate starting location of the interleaving process based on the end information when receiving the end information. In other words, the data recording is set to be performed by starting from a location that is at least the interleaving length ahead of the location following the ending location. Accordingly, a physical data series after the interleaving process is defined, and defined data can be recorded on the recording medium, and can be connected to the data recorded on the recording medium, by starting from the location following the ending location.

The timing management unit 18 obtains location information such as the sector address, the frame number and the word number, from the reproduced data of the synchronization detecting unit 14. Additionally, the timing management unit 18 obtains the end information stored in the memory 19. The timing management unit 18, then, compares the location information obtained from the reproduced data with the end information. If the location information matches with the end information, the timing management unit 18 outputs an instruction (a START signal) that permits the data recording, to the encoder 17.

Before receiving the START signal from the timing management unit 18, the encoder 17 carries out the interleaving process on data supplied from the data outputting unit 30, by starting from a data location that is at least six frames ahead of the ending location of the data recorded on the recording medium. Thus, the encoder 17 can output a defined physical data series, when the encoder 17 reaches a physical connection part of the data already recorded on the recording medium and the data to be recorded on the recording medium, since the interleaving process is completely settled by the time the encoder 17 reaches the physical connection part.

For example, a recording medium cannot be usually relieved because of a data recording error, in a case in which a data recording process is interrupted since a system is reset or powered off by some reason during the data recording process. On the other hand, according to the first embodiment, the information recording device 1 detects an end or an ending location of data that could not be completely recorded on the recording medium, by carrying out the above-described process. Subsequently, the information recording device 1 outputs the data again to the recording medium, by starting from a location corresponding to a sector address of a sector that includes data located the interleaving length (six frames) ahead of the ending location, thereby resuming recording the data on the recording medium.

A description will now be given of timing to resume the data recording process, with reference to FIGS. 2A through 2F. Since the ending location of the data recorded on the recording medium is located at the sector address 101, the frame number 1 and the word number 3, the timing management unit 18 gives the instruction (the START signal) to the encoder 17, to permit the data recording at the sector address 101, the frame number 2 and the word number 0.

The encoder 17 starts encoding data from the sector address 100, the frame number 0 and the word number 0, which is six frames ahead of the sector address 101, the frame number 2 and the word number 0, and defines the physical data output WDATA completely by the time the timing management unit 18 gives the instruction to the encoder 17 to permit the data recording.

Additionally, data items included in data are physically connected without any disconnection, by synchronizing the timing to start the data recording process to the reproduced data already recorded on the recording medium by use of the synchronization detecting unit 14. Accordingly, a reproduction error is reduced at the physical connection part of the data items.

On the other hand, by synchronizing the timing to start the data recording process to absolute-location information ATIP on the recording medium instead of synchronizing the timing to the reproduced data, the data is duplicated or omitted at the physical connection part. Consequently, the reproduction error occurs more often at the physical connection part.

A description will now be given of means for relating a recording medium on which recording data is missed to the missed recording data.

The ID detecting unit 16 reproduces the data recorded on the recording medium, which is outputted from the decoder 13. Subsequently, the ID detecting unit 16 extracts content information peculiar to the data, from the data. This content information is called recording-medium identification information DATA MEDIUM-ID. A value of the recording-medium identification information DATA MEDIUM-ID is considered being different for different data.

For instance, index information called a TOC (Table Of Contents) of data can be used as the recording-medium identification information DATA MEDIUM-ID. Alternatively, a result of adding the TOC sequentially by each fixed bit length may be used as the recording-medium identification information DATA MEDIUM-ID. Further, index information (directories) of a file composing the data may also be used as the recording-medium identification information DATA MEDIUM-ID.

The information recording device 1 searches for the recording-medium identification information DATA MEDIUM-ID when the recording medium is installed, and specifies data corresponding to the recording-medium identification information DATA MEDIUM-ID of the recording medium, among data recorded in the past.

Figure 5:
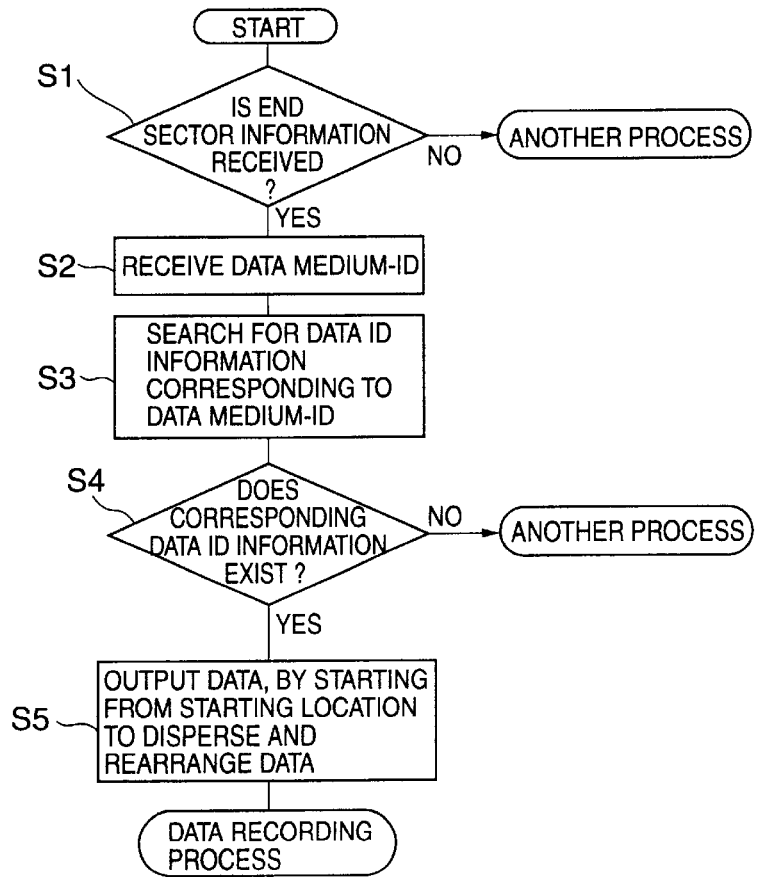
FIG. 5 is a flowchart showing processes carried out by an output management unit shown in FIG. 1.

A description will now be given of an information recording process performed by the information recording device 1 according to the first embodiment, with reference to FIG. 5. FIG. 5 is a flowchart showing processes carried out by the output management unit 31. The end detecting unit 15 detects the ending location of data recorded on the recording medium after the recording medium is installed, and, then, supplies the end sector information END-SCT to the output management unit 31 through the memory 19.

The output management unit 31 decides whether it receives the end sector information END-SCT from the memory 19, at a step S1 shown in FIG. 5. If it is determined at the step S1 that the output management unit 31 does not receive the end sector information END-SCT, the output management unit 31 determines that the data is not miswritten or the data recording process to the recording medium is not interrupted, and shifts to another process (a regular process). On the other hand, if it is determined at the step S1 that the output management unit 31 receives the end sector information END-SCT, the output management unit 31 proceeds to a step S2, and receives the recording-medium identification information DATA MEDIUM-ID about the recording medium.

Subsequently, the output management unit 31 searches through the memory 32 for data ID information that corresponds to the recording-medium identification information DATA MEDIUM-ID, at a step S3. At a step S4, the output management unit 31 decides whether the data ID information corresponding to the recording-medium identification information DATA MEDIUM-ID exists in the memory 32. If it is determined at the step S4 that the data ID information corresponding to the recording-medium identification information DATA MEDIUM-ID does not exist in the memory 32, the output management unit 31 shifts to another process. On the other hand, if it is determined at the step S4 that the data ID information corresponding to the recording-medium identification information DATA MEDIUM-ID exists in the memory 32, the output management unit 31 determines that a group of data files corresponding to the data ID information is specified as original recording data, and proceeds to a step S5.

At the step S5, the data outputting unit 30 outputs data that is supposed to be recorded two sectors ahead of the end sector (the ending location) among the above-described original recording data, to the encoder 17, as a starting location to disperse and rearrange the data for the time of resuming the data recording process. Subsequently, the encoder 17 carries out the above-described interleaving and data recording processes.

The data supposed to be recorded two sectors ahead of the end sector is set as the starting location to disperse and rearrange the data, in the above step S5. However, a method of calculating the starting location to disperse and rearrange the data differs with a value obtained as the end information. For example, if a sector number of a sector that is two sectors ahead of the end sector is obtained as the end information in advance, the output management unit 31 can simply set the sector as the starting location to disperse and rearrange the data. This starting location to disperse and rearrange the data is a selective item for designing the information recording device 1.

The information recording device 1 according to the first embodiment can resume the data recording process even if the information recording device 1 is powered off or reset, or the recording medium is switched during the data recording process, since the information recording device 1 keeps track of the ending location of the data recorded on the recording medium, when the data recording process is interrupted. Accordingly, even if the information recording device 1 cannot complete recording the data on the recording medium, it can restore or complete recording the data on the recording medium, afterwards.

Additionally, the information recording device 1 starts dispersing and rearranging data from a location before the ending location of the data, in which a space between the location and the ending location is enough for settling the interleaving process. Thus, recording data series before and after the ending location are connected continuously, and complete restoration of the data is achieved. Additionally, the information recording device 1 does not need to record data on the recording medium by starting from the beginning of the data, and, thus, can carry out a high-speed data recording process.

Additionally, the information recording device 1 synchronizes the timing to start recording data, to the reproduced data that is recorded on the recording medium. Accordingly, the information recording device 1 connects the data at the connection part without any disconnection, and reduces a reproduction error at the connection part.

Furthermore, the information recording device 1 can easily keep track of a location to resume the data recording process, and, thus, can restore the data on the recording medium easily. In addition, the information recording device 1 can automatically decide a location on the recording medium, at which the data recording process is interrupted. Thus, even if a certain period has passed after the interruption of the data recording process, the information recording device 1 can resume the data recording process or restore the data recorded on the recording medium easily. Consequently, the information recording device 1 can eliminate a selection error of a recording medium or data that is to be restored.

A description will now be given of a recording medium that stores an information recording program, according to a second embodiment of the present invention.

An information recording program that executes the above-described information recording process is stored in a recording medium such as a floppy disk or an optical disk, and is installed in an information recording device such as a general personal computer through the recording medium. The above-described information recording process can be performed by operating the information recording program by use of a control unit of the information recording device, which is a functional unit composed of a micro computer including a CPU, a ROM, a RAM and the like.

In other words, the recording medium not shown in the figures such as the floppy disk or the optical disk corresponds to a recording medium readable by a computer. The recording medium readable by the computer stores an information recording program that enables the computer to have a data writing function to write data having a fixed unit length in a recording medium, by dispersing and rearranging the data based on a fixed rule.

The information recording program also enables the computer to have an ending-location detecting function to detect an ending location of data recorded on the recording medium, and a starting-location deciding function to decide a starting location on the recording medium to start dispersing and rearranging the data, based on the ending location detected by the ending-location detecting function.

The information-recording program also enables the computer to have a dispersing/rearranging function to disperse and rearrange additional data to be added on the recording medium, by starting from the starting location decided by the starting-location deciding function, and a data adding function to write the additional data dispersed and rearranged by the dispersing/rearranging function, continuously from the ending location on the recording medium.

The information recording program also enables the computer to have a synchronizing function to synchronize a data-write timing to a reproducing timing of the data recorded on the recording medium until just before writing the additional data in the recording medium. Additionally, the information recording program enables the computer to have an information creating function to create content information indicating contents of the data recorded on the recording medium.

The information recording device, that is, the computer to which the above-described information recording program is installed, carries out the following processes.

In a case in which the information recording device writes data having a fixed unit length in a recording medium, by dispersing and rearranging the data based on a fixed rule, the information recording device initially detects the ending location of the data recorded on the recording medium. Subsequently, the information recording device decides the starting location on the recording medium to start dispersing and rearranging the data, based on the detected ending location.

The information recording device, then, disperses and rearranges additional data to be added on the recording medium, by starting from the starting location. Subsequently, the information recording device synchronizes a data-write timing to a reproducing timing of the data recorded on the recording medium until just before writing the additional data in the recording medium, and, then, writes the dispersed and rearranged additional data continuously from the ending location on the recording medium. In addition, the information recording device creates content information indicating contents of the data recorded on the recording medium.

By use of the recording medium readable by the computer and storing the information recording program according to the second embodiment, the above-described information-recording process can be easily introduced to a normal computer.

Figure 6:
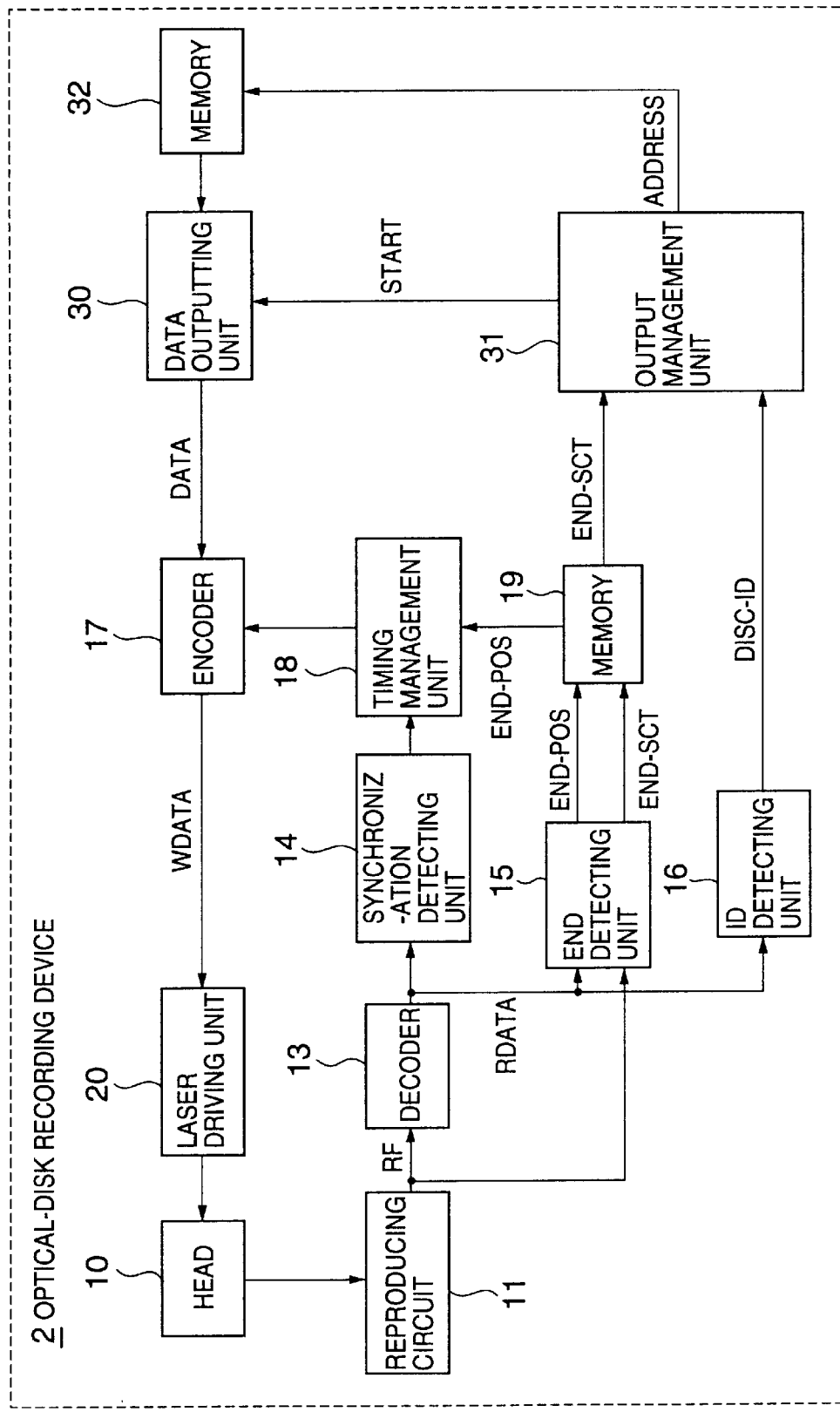
FIG. 6 is a block diagram showing a structure of an optical-disk recording device according to a third embodiment of the present invention.

A description will now be given of an optical-disk recording device and an optical-disk recording method, according to a third embodiment of the present invention. FIG. 6 is a block diagram showing a structure of an optical-disk recording device 2 according to the third embodiment.

The optical-disk recording device 2 shown in FIG. 6 includes the head 10, the reproducing circuit 11, the decoder 13, the synchronization detecting unit 14, the end detecting unit 15, the ID (Identification) detecting unit 16, the encoder 17, the timing management unit 18, the memory 19, the data outputting unit 30, the output management unit 31, the memory 32 and a laser driving unit 20. A unit shown in FIG. 6 corresponding to a unit shown in FIG. 1 has the same unit number as the unit shown in FIG. 1.

The head 10, the laser driving unit 20 and the encoder 17 function together as data writing means for interleaving data having a sector length and writing the data on an optical disk, by emitting laser light onto the optical disk. The end detecting unit 15 functions as ending-location detecting means for detecting an ending location of data recorded on the optical disk.

The synchronization detecting unit 14, the end detecting unit 15, the encoder 17 and the timing management unit 18 function together as starting-location deciding means for deciding a location that is an interleaving length away from the ending location detected by the ending-location detecting means as a starting location on the optical disk to start interleaving the data.

The encoder 17 functions as interleaving means for interleaving additional data to be added on the optical disk, by starting from the starting location decided by the starting-location deciding means. The head 10, the laser driving unit 20 and the encoder 17 function together as data adding means for writing the additional data interleaved by the interleaving means, continuously from the ending location on the optical disk.

The synchronization detecting unit 14, the encoder 17 and the timing management unit 18 function together as synchronizing means for synchronizing a data-write timing to a reproducing timing of the data recorded on the optical disk until just before writing the additional data on the optical disk. The ID detecting unit 16 functions as information creating means for creating content information indicating contents of the data recorded on the optical disk. Index information is used as the content information.

The head 10 included in the optical-disk recording device 2 is composed of a laser-light source for recording and reproducing data, an optical unit such as a light-collecting lens, a servomechanism, a reproduced-light detector, and the like, which are not shown in the figures. The head 10 accesses to the optical disk such as a CD-R or a CD-RW, and records data in or reproduces data from a recording area of the optical disk.

The laser driving unit 20 controls writing a recording mark corresponding to data, on the optical disk, by modulating a recording laser light outputted from the head 10 by using a fixed recording power.

The encoder 17 takes data or the recording data (DATA) supplied from the data outputting unit 30 as its input, and creates the physical recording data series (WDATA) by adding an error correction code to the data supplied from the data outputting unit 30, or carrying out an interleaving process or a modulation process on the data supplied from the data outputting unit 30. Subsequently, the encoder 17 outputs the data series (WDATA) to the laser driving unit 20.

A Reed-Solomon code is used as the above-described error correction code for optical disks included in a CD family such as a CD, a CD-R and a CD-RW. A description about this Reed-Solomon code is omitted in this embodiment since the Reed-Solomon code is well known. Additionally, such an error correction code is actually added to the physical recording data series. However, the error correction code is omitted from this embodiment for a description purpose.

Additionally, an EFM (Eight-Fourteen Modulation) is used as the above-described modulation process for the optical disks included in the CD family. The EFM is also well known, and, thus, a description about the EFM is omitted. A data dispersing and rearranging process that is called cross interleave, and is used for dispersing and rearranging data when recording the data on an optical disk, is used as the above-described interleaving process for the optical disks included in the CD family.

A detailed description will be given of the interleaving process with reference to FIGS. 2A through 2F. Data forms one frame for each four words, in which one word has an eight-bit length. Four frames of the data form one sector. The one sector is a minimum unit for the data to be recorded on the optical disk. As shown above, the number of units is reduced for simplifying a description. However, 24 words form one frame, and 98 frames form one sector, in fact on a CD.

According to the interleaving process, the input data series (DATA FROM HOST) shown in FIG. 2A is divided by each frame, and a data item (a word) inside each frame is delayed by following a fixed rule. Consequently, the output data series "ENCODING" is dispersed on the recording area of the optical disk. It should be noted that the numerical values (0–32) included in the data series "DATA FROM HOST", "ENCODING" and "WDATA" respectively shown in FIGS. 2A, 2B and 2C indicate an original order of the data items (words) included the input data series "DATA FROM HOST".

If the data format shown in FIGS. 2D, 2E and 2F is used for the interleaving process, a delay amount D[i] given for a word W[i] (i=0, 1, 2, 3) in a frame is 2×i frames. Additionally, a word order WD[i] of a data item (word) included in the input data series "DATA FROM HOST" after the rearrangement is 2×i×4+i word. Consequently, the input data series "DATA FROM HOST" shown in FIG. 2A is rearranged as the output data series "ENCODING" shown in FIG. 2B, by following arrows. For example, the data item [0] in the input data series "DATA FROM HOST" is rearranged to the 0'th place in the output data series "ENCODING". Similarly, the data item [1], the data item [2] and the data item [3] are rearranged to the ninth place, the eighteenth place, and the twenty-seventh place in the output data series "ENCODING".

The maximum delay with respect to an original data location in the input data series "DATA FROM HOST" is six frames (2×3) after the rearrangement, and is called the maximum interleaving length or the interleaving length. Even if errors exist continuously in a data series on a physical medium, the errors are dispersed, by carrying out the above-described interleaving process on the data series at the time of recording the data series. Thus, the dispersed errors can fit in a range of a correction ability of the error correction code, and error correction can be easily done on the dispersed errors.

Even if errors exist in two adjacent physical frames after the rearrangement of the data having the format shown in FIGS. 2D through 2F, each frame includes only one word error by focusing on the frame before the rearrangement. In a case in which a correction code that can fix one word error is included in each frame before the rearrangement, the one word error in each frame can be completely fixed by the correction code. For example, even if each of words 24, 17, 10, 3, 28, 21, 14 and 7 included in the data after the rearrangement is an error, as shown in FIG. 2B, each of the words corresponds to one word error in its corresponding frame of the data before the rearrangement. The maximum interleaving length on the CD is actually 108 frames, and its interleaving process is same as the fixed rule even if it is more complicated than the fixed rule.

In the interleaving process, an output data series is not defined unless data having a certain length is inputted as an input data series to the optical-disk recording device 2. Data items located in front of the data item [0] are supposed to fit in the empty spaces of the output data series "ENCODING" shown in FIG. 2B. If the data items are inputted to the optical-disk recording device 2 by starting from the data item [0], the empty spaces become indefinite. In other words, the data items must be inputted to the optical-disk recording device 2 by starting from a data item located at least the maximum interleaving length (six frames) ahead of the data item [0], in order to define a physical data series on the optical disk.

The description will be further given of the optical-disk recording device 2 according to the third embodiment.

The reproducing circuit 11 shown in FIG. 6 is composed of a waveform equalizer, an amplifier and the like, and detects a reproduction signal supplied from the head 10. The output signal of the reproducing circuit 11 is often called the RF (Radio Frequency) signal, since the output signal is generally a high-frequency analog signal modulated by recording data.

The decoder 13 takes the RF signal as its input, and digitalizes an analog waveform of the RF signal by using a waveform shaping circuit. Subsequently, the decoder 13 takes bit synchronization by using a PLL (Phase-Locked Loop) circuit, and demodulates data by using a data demodulator to output the demodulated data RDATA.

The synchronization detecting unit 14 distinguishes divided parts of reproduced data, after receiving a demodulation result (RDATA) from the decoder 13. For example, the synchronization detecting unit 14 outputs a synchronous pulse at an end part of a sector, a frame or a word. Additionally, the synchronization detecting unit 14 detects a sector number corresponding to an address of the sector. For example, the synchronization detecting unit 14 outputs information and pulses such as the sector number SNO (99, 100, 101), the sector synchronous signal SSYNC, and the frame synchronous signal FSYNC respectively shown in FIGS. 3A, 3B and 3C.

The end detecting unit 15 detects an end part of the data recorded on the optical disk. In detail, the end detecting unit 15 detects a word number, a frame number and a sector number of the last data recorded on the optical disk.

A description will now be given of an end detecting process performed by the end detecting unit 15, with reference to FIGS. 3A through 3F and 4. The end detecting unit 15 includes the address detecting unit 40, the frame detecting unit 41, the amplitude detecting unit 42 and the word detecting unit 43, as shown in FIG. 4. The end detecting unit 15 receives the demodulated data RDATA from the decoder 13, and inputs the demodulated data RDATA to the address detecting unit 40, the frame detecting unit 41 and the word detecting unit 43. In addition, the end detecting unit 15 receives the RF signal (an analog reproducing signal) from the reproducing circuit 11, and inputs the RF signal to the amplitude detecting unit 42.

The address detecting unit 40, the frame detecting unit 41 and the word detecting unit 43 detect a sector address of a sector, a frame number (0, 1, 2 or 3) of a frame in the sector, and a word number (0, 1, 2 or 3) in the frame, respectively, from the demodulated data RDATA. The amplitude detecting unit 42 sets a threshold to amplitude of the RF signal. If the amplitude of the RF signal exceeds the threshold, the amplitude detecting unit 42 activates the detection-permitting signal ENABLE. The amplitude detecting unit 42, then, outputs the ENABLE signal to the address detecting unit 40, the frame detecting unit 41 and the word detecting unit 43, thereby permitting the address detecting unit 40, the frame detecting unit 41 and the word detecting unit 43 to detect the sector address, the frame number and the word number, respectively.

Accordingly, the address detecting unit 40, the frame detecting unit 41 and the word detecting unit 43 keep detecting the sector address, the frame number and the word number, respectively, while the recording data exists. On the other hand, the address detecting unit 40, the frame detecting unit 41 and the word detecting unit 43 are prohibited to detect the sector address, the frame number and the word number, respectively, when the recording data reaches the end part thereof. Consequently, the sector address, the frame number and the word number are not updated, and are obtained as the end information END-SCT, END-FRM and END-WD, respectively.

For example, the diagrams shown in FIGS. 3A through 3F indicate that the data recorded on the optical disk ends at the sector address 101, the frame number 1 and the word number 3. Meanwhile, the ENABLE signal becomes inactive, and the sector address 101, the frame number 1 and the word number 3 are stored as the end information (END-SCT=101, END-FRM=1, END-WD=3).

The description will be further given of the optical-disk recording device 2 according to the third embodiment. The memory 19 shown in FIG. 6 stores the end information detected by the end detecting unit 15, and supplies at least the end sector information END-SCT to the output management unit 31. Information about the end sector may be the end sector 101 itself. However, the information is preferably the sector 99 that includes physical data located at least the interleaving length (six frames) ahead of the ending location. Alternatively, the information may be the end sector 101 that includes a location following the ending location, from which the next data recording starts, or the sector 100 that includes physical data located at least the interleaving length (six frames) ahead of the location included in the sector 101.

Setting of the end information is a selective item for designing the optical-disk recording device 2, and it is preferably predetermined to calculate an appropriate starting location of the interleaving process based on the end information when receiving the end information. In other words, the data recording is to be performed by starting from a location that is at least the interleaving length ahead of the location following the ending location. Accordingly, a physical data series after the interleaving process is defined, and defined data can be recorded on the optical disk, and can be connected to the data recorded on the optical disk, by starting from the location following the ending location.

The timing management unit 18 obtains location information such as the sector address, the frame number and the word number, from the reproduced data of the synchronization detecting unit 14. Additionally, the timing management unit 18 obtains the end information stored in the memory 19. The timing management unit 18, then, compares the location information obtained from the reproduced data with the end information. If the location information matches with the end information, the timing management unit 18 outputs an instruction (the START signal) that permits the data recording, to the encoder 17.

Before receiving the START signal from the timing management unit 18, the encoder 17 carries out the interleaving process on data supplied from the data outputting unit 30, by starting from a data location that is at least six frames ahead of the ending location of the data recorded on the optical disk. Thus, the encoder 17 can output a defined physical data series, when the encoder 17 reaches a physical connection part of the data already recorded on the optical disk and the data to be recorded on the optical disk, since the interleaving process is completely settled by the time the encoder 17 reaches the physical connection part.

For example, an optical disk cannot be usually relieved because of a data recording error, in a case in which a data recording process is interrupted since a system is reset or powered off by some reason during the data recording process. On the other hand, according to the third embodiment, the optical-disk recording device 2 detects an end or an ending location of data that could not be completely recorded on the optical disk, by carrying out the above-described process. Subsequently, the optical-disk recording device 2 outputs the data again to the optical disk, by starting from a location corresponding to a sector address of a sector that includes data located the interleaving length (six frames) ahead of the ending location, thereby resuming recording the data on the optical disk.

A description will now be given of timing to resume the data recording process, with reference to FIGS. 2A through 2F. Since the ending location of the data recorded on the optical disk is located at the sector address 101, the frame number 1 and the word number 3, the timing management unit 18 gives the instruction (the START signal) to the encoder 17, to permit the data recording at the sector address 101, the frame number 2 and the word number 0.

The encoder 17 starts encoding data from the sector address 100, the frame number 0 and the word number 0, which is six frames ahead of the sector address 101, the frame number 2 and the word number 0, and defines the physical data output WDATA completely by the time the timing management unit 18 gives the instruction to the encoder 17 to permit the data recording.

Additionally, data items included in data are physically connected without any disconnection, by synchronizing the timing to start the data recording process to the reproduced data already recorded on the optical disk by use of the synchronization detecting unit 14. Accordingly, a reproduction error is reduced at the physical connection part of the data items.

On the other hand, by synchronizing the timing to start the data recording process to absolute-location information ATIP on the optical disk instead of synchronizing the timing to the reproduced data, the data is duplicated or omitted at the physical connection part. Consequently, the reproduction error occurs more often at the physical connection part.

A description will now be given of means for relating an optical disk on which recording data is missed to the missed recording data.

The ID detecting unit 16 reproduces the data recorded on the optical disk, which is outputted from the decoder 13. Subsequently, the ID detecting unit 16 extracts content information peculiar to the data, from the data. This content information is called optical-disk identification information DISC-ID. A value of the optical-disk identification information DISC-ID is considered being different for different data.

For instance, in a case in which data is music data, the data is recorded on the optical disk by use of a format shown in FIGS. 7A, 7B and 7C. In such a case, index information called a TOC (Table Of Contents) is recorded preceding a program area (PROGRAM). The TOC is composed of a start address of each piece (a track) of music. Accordingly, the TOC-can be used as the optical-disk identification information DISC-ID, since it is assumed that two music data items are the same if all the pieces of music included in one of the music data items are recorded in the same order and have the same lengths (by a 1/75 second unit on a CD) as the other music data item.

FIG. 8 is a diagram showing a format of the TOC used for a music disk. The TOC of the music disk includes a track number, that is, a number assigned for each piece (a track) of music, and a start address of the track, by relating the start address to the track number. The TOC shown in FIG. 8 indicates that four pieces 1 through 4 are included in the music disk, and the start address of the pieces 1 through 4 are 0, 1000, 3000 and 7000, respectively. A track number "AA" is a next address after the fourth piece ends, and is called a lead-out.

Additionally, a result of adding the TOC sequentially by a certain bit length may also be used as the optical-disk identification information DISC-ID. For example, if it is assumed that information about each track has a 10-byte size, a total size of the TOC shown in FIG. 8 is 50 bytes. This information is added by each 2 bytes to a 2-byte variable number whose initial value is "0". Even if an overflow occurs during the addition, an overflowed bit is not carried, by maintaining the lowest 2 bytes. Such an addition is called a sum value, and is in common use. If sum values of two data items are the same, the two data items are assumed identical. The optical-disk identification information DISC-ID can be expressed in small-size data by using the sum value.

However, in a case in which data is computer data, the data is often recorded on a CD as a track, and, thus, identifying the CD by use of the TOC is unsafe. In such a case, index information or directory information about files composing the data is recorded at the beginning of the data as shown in FIG. 7C, and can be used as the optical-disk identification information DISC-ID.

FIG. 9 is a diagram showing a format of the directory information. The directory information includes items such as a file name of file data, a start address of the file data and a size of the file data, by relating the items to each other. The entire directory information or a sum value of each item may be used as the optical-disk identification information DISC-ID.

The above-described optical-disk identification information is preferably obtained from data recorded on a first half of the optical disk, since the optical-disk identification information cannot be obtained from data recorded on a second half of the optical disk in a case in which the optical-disk recording device 2 miswrites data or stops writing the data before completing writing the optical-disk identification information DISC-ID on the second half of the optical disk.

The TOC or the directory information is always recorded around the beginning of the recording area of the optical disk. In other words, the TOC or the directory information is often recorded before the data is miswritten, and, thus, the TOC or the directory information is preferably used as the optical-disk identification information DISC-ID. The optical-disk recording device 2 searches for the optical-disk identification information DISC-ID of an optical disk when the optical disk is installed, and specifies data corresponding to the optical-disk identification information DISC-ID among data that has been processed through the data recording process in the past, based on the optical-disk identification information DISC-ID.

A description will now be given of an information recording process carried out by the optical-disk recording device 2 according the third embodiment, with reference to FIG. 5.

The end detecting unit 15 detects the ending location of data recorded on an optical disk after the optical disk is installed, and, then, supplies the end sector information END-SCT to the output management unit 31 through the memory 19.

The output management unit 31 decides whether it receives the end sector information END-SCT from the memory 19, at the step S1 shown in FIG. 5. If it is determined at the step S1 that the output management unit 31 does not receive the end sector information END-SCT, the output management unit 31 determines that the data is not miswritten or the data recording process to the optical disk is not interrupted, and shifts to another process (a regular process). On the other hand, if it is determined at the step S1 that the output management unit 31 receives the end sector information END-SCT, the output management unit 31 proceeds to the step S2, and receives the optical-disk identification information DISC-ID about the optical disk.

Subsequently, the output management unit 31 searches through the memory 32 for data ID information that corresponds to the optical-disk identification information DISC-ID, at the step S3.

This data ID information is called a project for each group of information. FIG. 10 is a diagram showing a format of the data ID information stored in the memory 32. A project of the data ID information shown in FIG. 10 is music data, and is composed of three pieces (tracks) of music. A data ID of this data ID information shown in FIG. 10 is "ID1", and music data files corresponding to the three tracks are "Track1.wav", "Track2.wav" and "Track3.wav". The data ID "ID1" is preferably created by the same algorithm as the creation of the above-described optical-disk identification information DISC-ID.

At the step S4 shown in FIG. 5, the output management unit 31 decides whether the data ID information corresponding to the optical-disk identification information DISC-ID exists in the memory 32. If it is determined at the step S4 that the data ID information corresponding to the optical-disk identification information DISC-ID does not exist in the memory 32, the output management unit 31 shifts to another process. On the other hand, if it is determined at the step S4 that the data ID information corresponding to the optical-disk identification information DISC-ID exists in the memory 32, the output management unit 31 determines that a group of data files corresponding to the data ID information is specified as original recording data, and proceeds to the step S5.

At the step S5, the data outputting unit 30 outputs data (a data item) that is supposed to be recorded two sectors ahead of the end sector (the ending location) among the above-described original recording data, to the encoder 17, as a starting location to disperse and rearrange the data or to start the interleaving process, for the time of resuming the data recording process. Subsequently, the encoder 17 carries out the above-described interleaving and data recording processes.

As described above, the optical-disk recording device 2 can easily obtain information about which data is written in which sector, by checking the information about the above-described project. Accordingly, the optical-disk recording device 2 can easily output data again by starting from the middle of the data, as long as the optical-disk recording device 2 can obtain the end information about the data.

The data supposed to be recorded two sectors ahead of the end sector is set as the starting location for the interleaving process of the data, in the above step S5. However, a method of calculating the starting location differs with a value obtained as the end information. For example, if a sector number of a sector that is two sectors ahead of the end sector is obtained as the end information in advance, the output management unit 31 can simply set the sector as the starting location for the interleaving process. This starting location for the interleaving process is a selective item for designing the optical-disk recording device 2.

The optical-disk recording device 2 according to the third embodiment can resume the data recording process even if the optical-disk recording device 2 is powered off or reset, or the optical disk is switched during the data recording process, since the optical-disk recording device 2 keeps track of the ending location of the data recorded on the optical disk, when the data recording process is interrupted. Accordingly, even if the optical-disk recording device 2 cannot complete recording the data on the optical disk, it can restore or complete recording the data on the optical disk, afterwards.

Additionally, the optical-disk recording device 2 starts dispersing and rearranging data from a location before the ending location, in which a space between the location and the ending location is enough for settling the interleaving process. Thus, recording data series before and after the ending location are connected continuously, and complete restoration of the data is achieved. Additionally, the optical-disk recording device 2 does not need to record data on the optical disk by restarting from the beginning of the data, and, thus, can carry out a high-speed data recording process.

Additionally, the optical-disk recording device 2 synchronizes the timing to start recording data, to the reproduced data that is recorded on the optical disk. Accordingly, the optical-disk recording device 2 connects the data at the connection part without any disconnection, and reduces a reproduction error at the connection part.

Furthermore, the optical-disk recording device 2 can easily keep track of a location to resume the data recording process, and, thus, can restore the data on the optical disk easily. In addition, the optical-disk recording device 2 can automatically decide a location on the optical disk, at which the data recording process is interrupted. Thus, even if a certain period has passed after the interruption of the data recording process, the optical-disk recording device 2 can resume the data recording process or restore the data recorded on the optical disk easily. Consequently, the optical-disk recording device 2 can eliminate a selection error of an optical disk or data that is to be restored.

Figure 11:
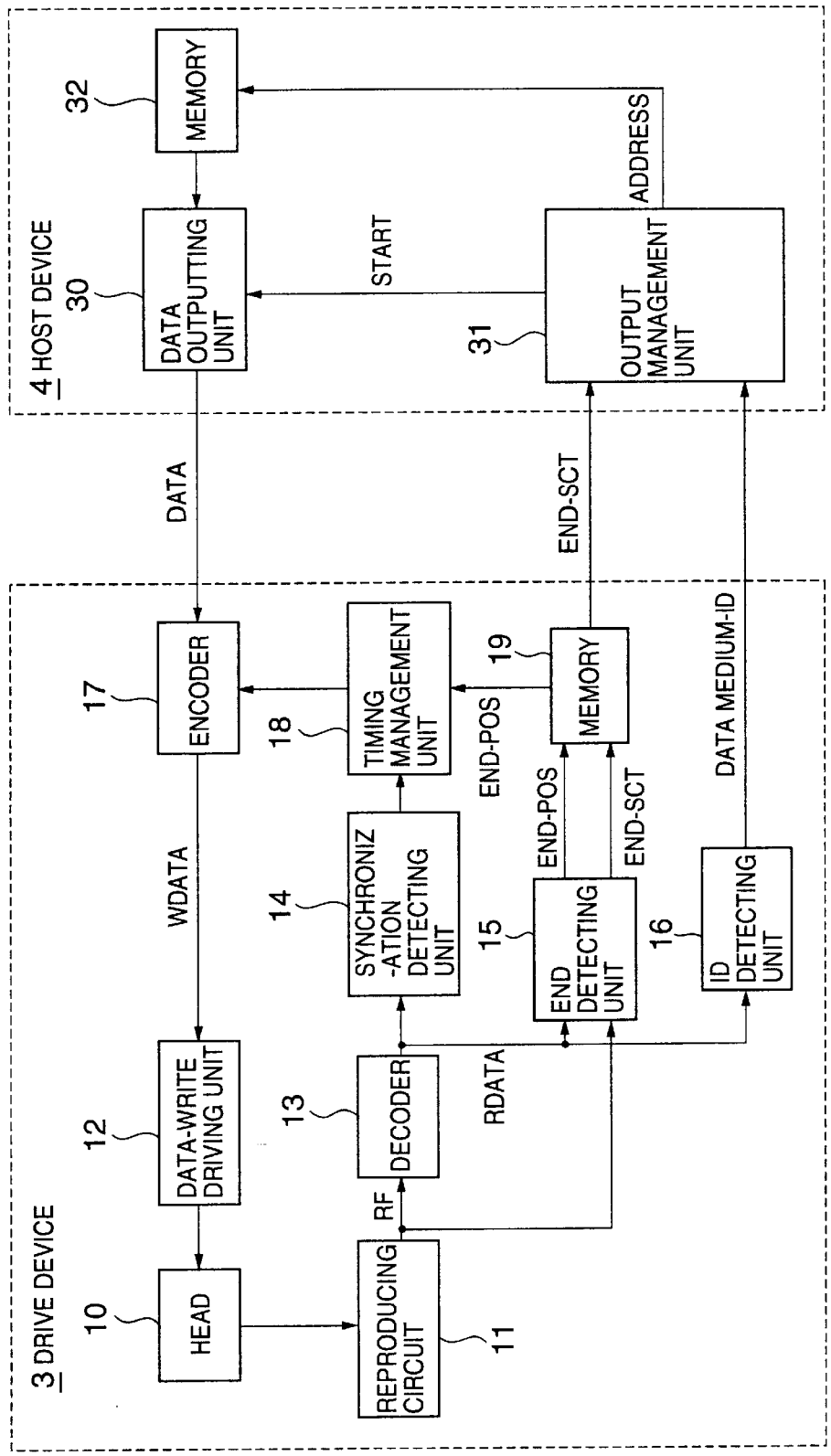
FIG. 11 is a block diagram showing a structure of an information recording system according to a fourth embodiment of the present invention.

A description will now be given of an information recording system according to a fourth embodiment of the present invention. FIG. 11 is a block diagram showing a structure of the information recording system according to the fourth embodiment. A unit shown in FIG. 11 corresponding to a unit shown in FIG. 1 has the same unit number as the unit shown in FIG. 1.

The information recording system shown in FIG. 11 includes a drive device 3 and a host device 4. The drive device 3 is an information recording unit such as a CD-R/CD-RW driving device that writes data in a recording medium by dispersing and rearranging the data based on a fixed rule, in which the data has a fixed unit length and is outputted by the host device 4. The host device 4 is an upper-level device such as a personal computer that outputs the data to be recorded on the recording medium, which is installed in the drive device 3. The drive device 3 and the host device 4 are connected to each other through an interface such as a SCSI (Small Computer System Interface), an ATAPI (AT Attachment Packet Interface), or a USB (Universal Serial Bus).

The host device 4 is a microcomputer that is composed of a CPU, a ROM and a RAM, for instance, and includes the data outputting unit 30, the output management unit 31 and the memory 32.

The drive device 3 includes the head 10, the reproducing circuit 11, the data-write driving unit 12, the decoder 13, the synchronization detecting unit 14, the end detecting unit 15, the ID (Identification) detecting unit 16, the encoder 17, the timing management unit 18 and the memory 19.

The head 10, the data-write driving unit 12 and the encoder 17 function together as data writing means for writing data having a fixed unit length in a recording medium, by dispersing and rearranging the data based on a fixed rule. The end detecting unit 15 functions as ending-location detecting means for detecting an ending location of data recorded on the recording medium.

The synchronization detecting unit 14, the end detecting unit 15, the encoder 17 and the timing management unit 18 function together as starting-location deciding means for deciding a starting location on the recording medium to start dispersing and rearranging the data, based on the ending location detected by the ending-location detecting means.

The encoder 17 functions as dispersing/rearranging means for dispersing and rearranging additional data to be added on the recording medium, by starting from the starting location decided by the starting-location deciding means.

The head 10, the data-write driving unit 12 and the encoder 17 function together as data adding means for writing the additional data dispersed and rearranged by the dispersing/rearranging means, continuously from the ending location on the recording medium.

The synchronization detecting unit 14, the encoder 17 and the timing management unit 18 function together as synchronizing means for synchronizing a data-write timing to a reproducing timing of the data recorded on the recording medium until just before writing the additional data in the recording medium.

The ID detecting unit 16 functions as information creating means for creating content information indicating contents of the data recorded on the recording medium.

Additionally, index information and a sector length are used as the above-described content information and fixed unit length. A location that is at least an interleaving length away from the ending location is used as the starting location. An interleaving process is applied to dispersion and rearrangement based on the fixed rule.

The interleaving process performed by the information recording system, and the end detecting process performed by the end detecting unit 15 of the drive device 3 are the same as the processes described with reference to FIGS. 2A through 2F and FIGS. 3A through 3F, respectively. In addition, the internal structure of the end detecting unit 15 included in the drive device 3 is the same as the structure shown in FIG. 4. Thus, the descriptions are omitted.

The memory 19 shown in FIG. 11 stores the end information detected by the end detecting unit 15, and supplies at least the end sector information END-SCT to the output management unit 31 of the host device 4. This end information is a selective item for designing the information recording system, and it is preferably predetermined that the host device 4 calculates an appropriate starting location of the interleaving process based on the end information when receiving the end information.

A recording medium cannot be usually relieved because of a data recording error, in a case in which a data recording process is interrupted since the information recording system is reset or powered off by some reason during the data recording process.

On the other hand, in the information recording system according to the fourth embodiment, the drive device 3 detects an end or an ending location of data that could not be completely recorded on the recording medium, by carrying out the above-described process, when the recording medium having the recording error is inserted to the drive device 3. Subsequently, the drive device 3 notifies the output management unit 31 of the host device 4 about the ending location (an ending address).

After receiving the ending address or information related to the ending location from the drive device 3, the output management unit 31 of the host device 4 decides a location corresponding to a sector address of a sector that includes data (a data item) located the interleaving length (six frames) ahead of the ending address or the information related to the ending location, as the starting location to disperse and rearrange additional data that is to be added on the recording medium.

Subsequently, the data outputting unit 30 outputs data that could not be completely recorded on the recording medium once more, by starting from the ending location or a part of the data where the data recording process is interrupted, thereby resuming the data recording process.

A process to set the timing to resume the data recording process by the information recording system is the same as the process described with reference to FIGS. 2A through 2F. In addition, the means for relating a recording medium on which recording data is missed to the missed recording data is described above. Thus, the descriptions are omitted.

A description will now be given of an information recording process performed by the information recording system according to the fourth embodiment, with reference to FIG. 5. The drive device 3 detects the ending location of data recorded on the recording medium after the recording medium is installed, and, then, supplies the end sector information END-SCT to the output management unit 31 through the memory 19.

The output management unit 31 of the host device 4 decides whether it receives the end sector information END-SCT from the memory 19, at the step S1 shown in FIG. 5. If it is determined at the step S1 that the output management unit 31 does not receive the end sector information END-SCT, the output management unit 31 determines that the data is not miswritten or the data recording process to the recording medium is not interrupted, and shifts to another process (a regular process). On the other hand, if it is determined at the step S1 that the output management unit 31 receives the end sector information END-SCT, the output management unit 31 proceeds to the step S2, and receives the recording-medium identification information DATA MEDIUM-ID about the recording medium.

Subsequently, the output management unit 31 searches through the memory 32 for data ID information that corresponds to the recording-medium identification information DATA MEDIUM-ID, at the step S3. At the step S4, the output management unit 31 decides whether the data ID information corresponding to the recording-medium identification information DATA MEDIUM-ID exists in the memory 32. If it is determined at the step S4 that the data ID information corresponding to the recording-medium identification information DATA MEDIUM-ID does not exist in the memory 32, the output management unit 31 shifts to another process. On the other hand, if it is determined at the step S4 that the data ID information corresponding to the recording-medium identification information DATA MEDIUM-ID exists in the memory 32, the output management unit 31 determines that a group of data files corresponding to the data ID information is specified as original recording data, and proceeds to the step S5.

At the step S5, the data outputting unit 30 outputs data that is supposed to be recorded two sectors ahead of the end sector (the ending location) among the above-described original recording data, to the encoder 17, as a starting location to disperse and rearrange the data for the time of resuming the data recording process. Subsequently, the encoder 17 carries out the above-described interleaving and data recording processes.

The data supposed to be recorded two sectors ahead of the end sector is set as the starting location to disperse and rearrange the data, in the above step S5. However, a method of calculating the starting location to disperse and rearrange the data differs with a value obtained as the end information. For example, if a sector number of a sector that is two sectors ahead of the end sector is obtained as the end information in advance, the output management unit 31 can simply set the sector as the starting location to disperse and rearrange the data. This starting location to disperse and rearrange the data is a selective item for designing the information recording system.

The information recording system according to the fourth embodiment can resume the data recording process even if the information recording system is powered off or reset, or the recording medium is switched during the data recording process, since the drive device 3 keeps track of the ending location of the data recorded on the recording medium, when the data recording process is interrupted. Accordingly, even if the information recording system cannot complete recording the data on the recording medium, it can restore or complete recording the data on the recording medium, afterwards.

Additionally, the information recording system starts dispersing and rearranging data from a location before the ending location of the data, in which a space between the location and the ending location is enough for settling the interleaving process. Thus, recording data series before and after the ending location are connected continuously, and complete restoration of the data is achieved. Additionally, the information recording system does not need to record data on the recording medium by starting from the beginning of the data, and, thus, can carry out a high-speed data recording process.

Additionally, the information recording system synchronizes the timing to start recording data, to the reproduced data that is recorded on the recording medium. Accordingly, the information recording system connects the data at the connection part without any disconnection, and reduces a reproduction error at the connection part.

Furthermore, the host device 4 can easily keep track of a location to resume the data recording process, and, thus, can restore the data on the recording medium easily. In addition, the information recording system can automatically decide a location on the recording medium, at which the data recording process is interrupted. Thus, even if a certain period has passed after the interruption of the data recording process, the information recording system can resume the data recording process or restore the data recorded on the recording medium easily. Consequently, the information recording system can eliminate a selection error of a recording medium or data that is to be restored.

Figure 12:
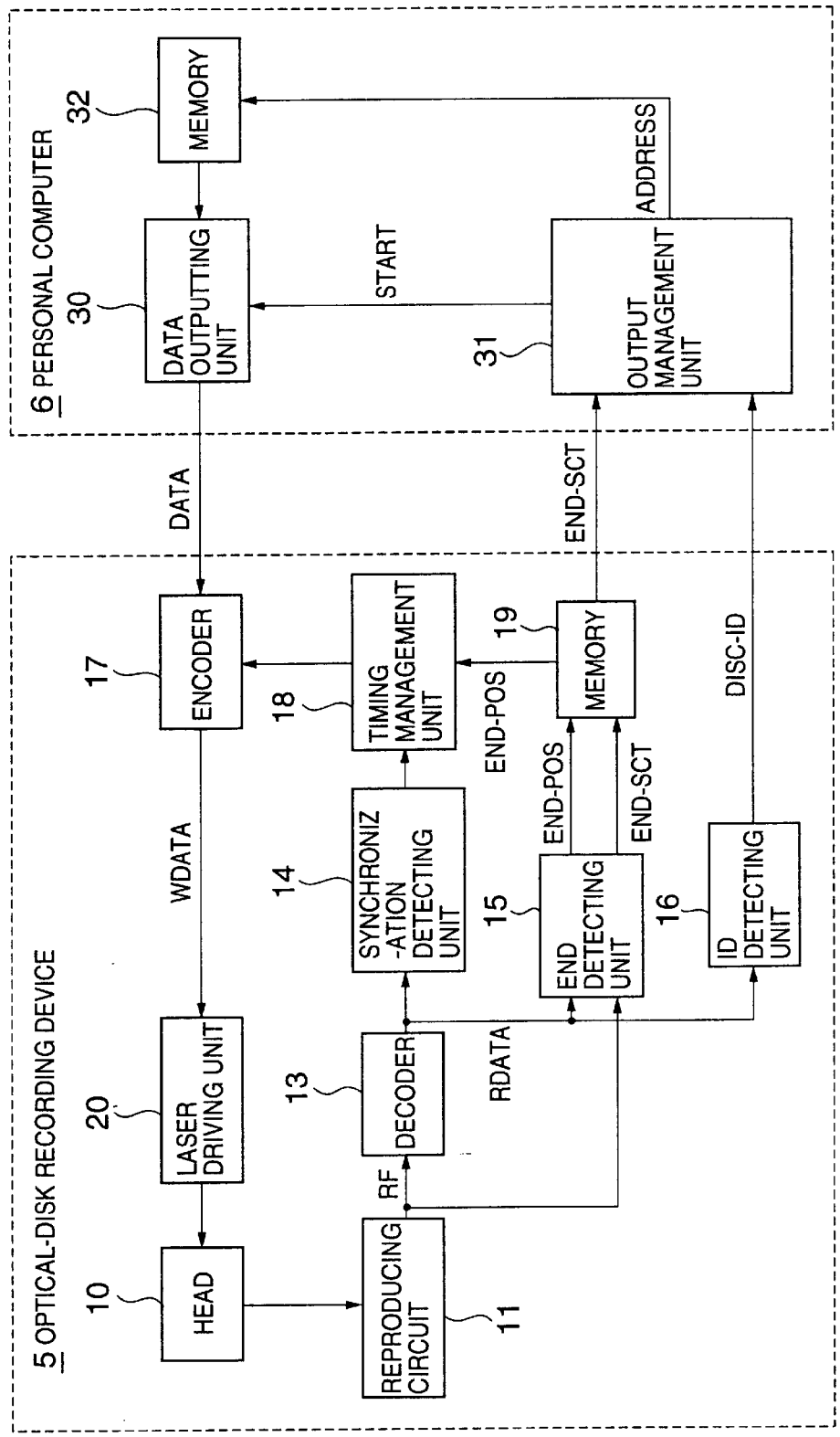
FIG. 12 is a block diagram showing a structure of an optical-disk recording system according to a fifth embodiment of the present invention.

A description will now be given of an optical-disk recording system according to a fifth embodiment of the present invention, with reference to FIG. 12. FIG. 12 is a block diagram showing a structure of the optical-disk recording system according to the fifth embodiment. A unit shown in FIG. 12 corresponding to a unit shown in FIG. 6 has the same unit number as the unit shown in FIG. 6.

The optical-disk recording system shown in FIG. 12 includes an optical-disk recording device 5 and a personal computer 6. The optical-disk recording device 5 is a CD-R/CD-RW driving device or the like that interleaves data and writes the data on an optical disk by emitting laser light onto the optical disk, in which the data has a sector length and is outputted from the personal computer 6. The personal computer 6 outputs the data to be recorded on the optical disk, which is installed in the optical-disk recording device 5. The optical-disk recording device 5 and the personal computer 6 are connected to each other through an interface such as the SCSI, the ATAPI, or the USB.

For instance, the personal computer 6 is a microcomputer that is composed of a CPU, a ROM and a RAM, and includes the data outputting unit 30, the output management unit 31 and the memory 32. The optical-disk recording device 5 includes the head 10, the reproducing circuit 11, the laser driving unit 20, the decoder 13, the synchronization detecting unit 14, the end detecting unit 15, the ID (Identification) detecting unit 16, the encoder 17, the timing management unit 18 and the memory 19.

The head 10, the laser driving unit 20 and the encoder 17 function together as data writing means for interleaving data having a sector length, and writing the data on an optical disk by emitting laser light onto the optical disk. The end detecting unit 15 functions as ending-location detecting means for detecting an ending location of data recorded on the optical disk.

The synchronization detecting unit 14, the end detecting unit 15, the encoder 17 and the timing management unit 18 function together as starting-location deciding means for deciding a location on the optical disk that is the interleaving length away from the ending location detected by the ending-location detecting means, as a starting location for interleaving the data.

The encoder 17 functions as interleaving means for interleaving additional data to be added on the optical disk, by starting from the starting location decided by the starting-location deciding means.

The head 10, the laser driving unit 20 and the encoder 17 function together as data adding means for writing the additional data interleaved by the interleaving means, continuously from the ending location on the optical disk.

The synchronization detecting unit 14, the encoder 17 and the timing management unit 18 function together as synchronizing means for synchronizing a data-write timing to a reproducing timing of the data recorded on the optical disk until just before writing the additional data on the optical disk.

The ID detecting unit 16 functions as information creating means for creating content information indicating contents of the data recorded on the optical disk. Additionally, index information is used as the above-described content information.

The interleaving process performed by the optical-disk recording system, and the end detecting process performed by the end detecting unit 15 of the optical-disk recording device 5 are the same as the processes described with reference to FIGS. 2A through 2F and FIGS. 3A through 3F, respectively. In addition, the internal structure of the end detecting unit 15 included in the optical-disk recording device 5 is the same as the structure shown in FIG. 4. Thus, the descriptions are omitted.

The encoder 17 of the optical-disk recording device 5 shown in FIG. 12 takes data or recording data (DATA) supplied from the data outputting unit 30 of the personal computer 6 as its input, and creates a physical recording data series WDATA, by adding an error correction code to the recording data DATA, or by carrying out the interleaving process or the modulation process to the recording data DATA. Subsequently, the encoder 17 outputs the created data series WDATA to the laser driving unit 20.

The memory 19 of the optical-disk recording device 5 stores the end information that indicates the ending location detected by the end detecting unit 15, and supplies at least the end sector information END-SCT to the output management unit 31 of the personal computer 6. This end information is a selective item for designing the optical-disk recording system, and it is preferably predetermined that the personal computer 6 calculates an appropriate starting location of the interleaving process based on the end information when receiving the end information.

An optical disk cannot be usually relieved because of a data recording error, in a case in which a data recording process is interrupted since the optical-disk recording system is reset or powered off by some reason during the data recording process.

On the other hand, in the optical-disk recording system according to the fifth embodiment, the optical-disk recording device 5 detects an end or an ending location of data that could not be completely recorded on the optical disk, by carrying out the above-described process, when the optical disk having the recording error is inserted to the optical-disk recording device 5. Subsequently, the optical-disk recording device 5 notifies the output management unit 31 of the personal computer 6 about the ending location (an ending address).

After receiving the ending address or information related to the ending location from the optical-disk recording device 5, the output management unit 31 of the personal computer 6 decides a location corresponding to a sector address of a sector that includes data (a data item) located the interleaving length (six frames) ahead of the ending address or the information related to the ending location, as the starting location to disperse and rearrange additional data that is to be added on the optical disk.

Subsequently, the data outputting unit 30 outputs data that could not be completely recorded on the optical disk once more, by starting from the ending location or a part of the data where the data recording process is interrupted, thereby resuming the data recording process.

A process to set the timing to resume the data recording process by the optical-disk recording system is the same as the process described with reference to FIGS. 2A through 2F. In addition, the means for relating a recording medium or an optical disk on which recording data is missed to the missed recording data is described above. Thus, the descriptions are omitted.

A description will now be given of an information recording process performed by the optical-disk recording system according to the fifth embodiment, with reference to FIG. 5. The optical-disk recording device 5 detects the ending location of data recorded on the optical disk after the optical disk is installed, and, then, supplies the end sector information END-SCT to the output management unit 31 of the personal computer 6 through the memory 19.

The output management unit 31 of the personal computer 6 decides whether it receives the end sector information END-SCT from the memory 19, at the step S1 shown in FIG. 5. If it is determined at the step S1 that the output management unit 31 does not receive the end sector information END-SCT, the output management unit 31 determines that the data is not miswritten or the data recording process to the optical disk is not interrupted, and shifts to another process (a regular process). On the other hand, if it is determined at the step S1 that the output management unit 31 receives the end sector information END-SCT, the output management unit 31 proceeds to the step S2, and receives the optical disk identification information DISC-ID about the optical disk.

Subsequently, the output management unit 31 searches through the memory 32 for data ID information that corresponds to the optical disk identification information DISC-ID, at the step S3. At the step S4, the output management unit 31 decides whether the data ID information corresponding to the optical disk identification information DISC-ID exists in the memory 32. If it is determined at the step S4 that the data ID information corresponding to the optical disk identification information DISC-ID does not exist in the memory 32, the output management unit 31 shifts to another process. On the other hand, if it is determined at the step S4 that the data ID information corresponding to the optical disk identification information DISC-ID exists in the memory 32, the output management unit 31 determines that a group of data files corresponding to the data ID information is specified as original recording data, and proceeds to the step S5.

At the step S5, the data outputting unit 30 outputs data that is supposed to be recorded two sectors ahead of the end sector (the ending location) among the above-described original recording data, to the encoder 17, as a starting location to disperse and rearrange or interleave the data for the time of resuming the data recording process. Subsequently, the encoder 17 carries out the above-described interleaving and data recording processes.

By using information about the above-described project shown in FIG. 10, the optical-disk recording system can easily obtain information about which data is supposed to be recorded at which location on the optical disk, and, thus, can output data by starting from a location at which the data recording process is interrupted, as long as the optical-disk recording system can obtain the end information about the data.

The data supposed to be recorded two sectors ahead of the end sector is set as the starting location for interleaving the data, in the above step S5. However, a method of calculating the starting location for interleaving the data differs with a value obtained as the end information. For example, if a sector number of a sector that is two sectors ahead of the end sector is obtained as the end information in advance, the output management unit 31 can simply set the sector as the starting location for interleaving the data. This starting location for interleaving the data is a selective item for designing the optical-disk recording system.

The optical-disk recording system according to the fifth embodiment can resume the data recording process even if the optical-disk recording system is powered off or reset, or the optical disk is switched during the data recording process, since the optical-disk recording device 5 keeps track of the ending location of the data recorded on the optical disk, when the data recording process is interrupted. Accordingly, even if the optical-disk recording system cannot complete recording the data on the optical disk, it can restore or complete recording the data on the optical disk, afterwards.

Additionally, the optical-disk recording system starts dispersing and rearranging data from a location before the ending location of the data, in which a space between the location and the ending location is enough for settling the interleaving process. Thus, recording data series before and after the ending location are connected continuously, and complete restoration of the data is achieved. Additionally, the optical-disk recording system does not need to record data on the optical disk by restarting from the beginning of the data, and, thus, can carry out a high-speed data recording process.

Additionally, the optical-disk recording system synchronizes the timing to start recording data, to the reproduced data that is recorded on the optical disk. Accordingly, the optical-disk recording system connects the data at the connection part without any disconnection, and reduces a reproduction error at the connection part.

Furthermore, the personal computer 6 can easily keep track of a location to resume the data recording process, and, thus, can restore the data on the optical disk easily. In addition, the optical-disk recording system can automatically decide a location on the optical disk, at which the data recording process is interrupted. Thus, even if a certain period has passed after the interruption of the data recording process, the optical-disk recording system can resume the data recording process or restore the data recorded on the optical disk easily. Consequently, the optical-disk recording system can eliminate a selection error of an optical disk or data that is to be restored.

Figure 13:
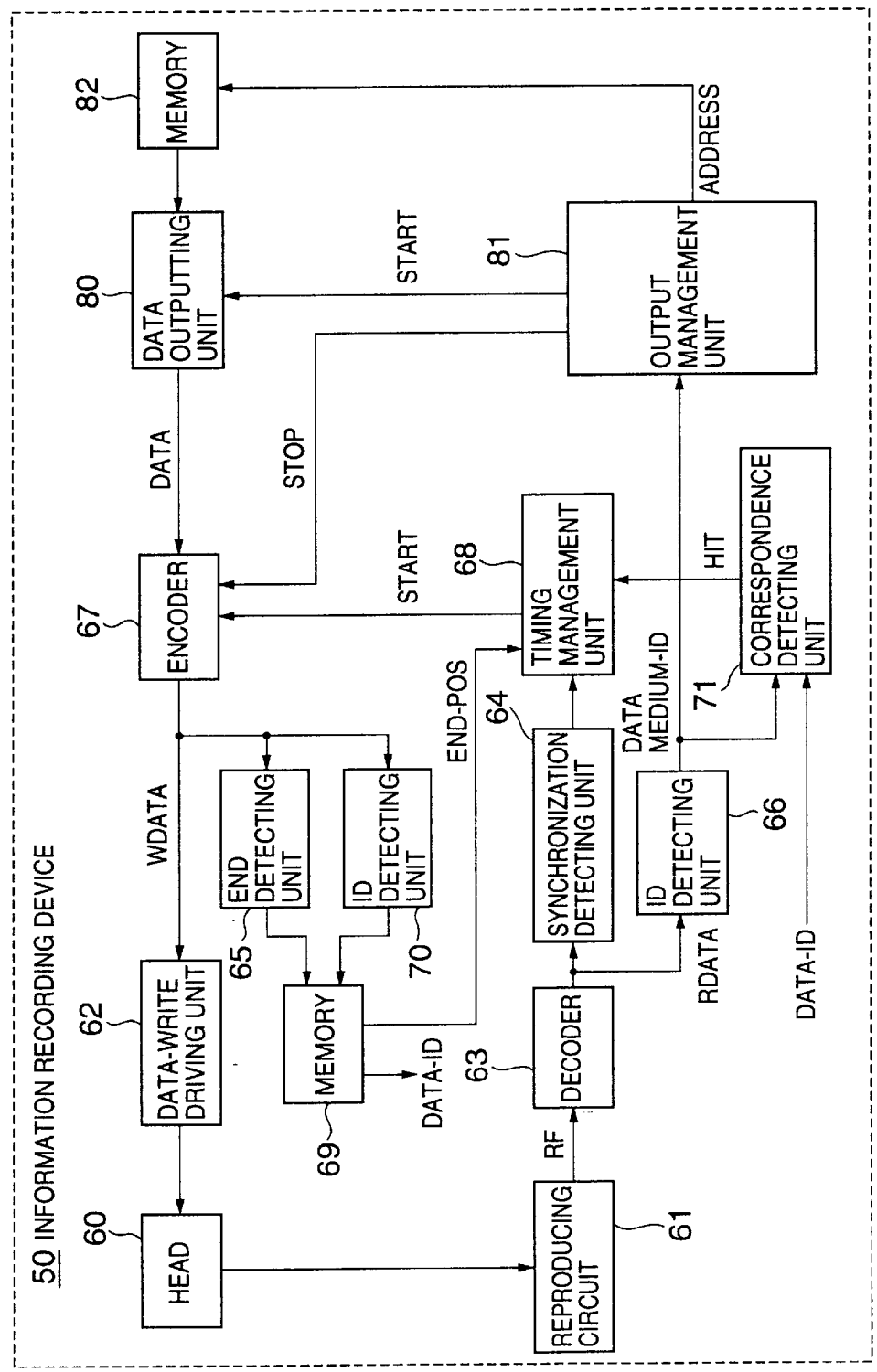
FIG. 13 is a block diagram showing a structure of an information recording device according to a sixth embodiment of the present invention.

A description will now be given of an information recording device according to a sixth embodiment of the present invention. FIG. 13 is a block diagram showing a structure of an information recording device 50 according to the sixth embodiment. The information recording device 50 shown in FIG. 13 includes a head 60, a reproducing circuit 61, a data-write driving unit 62, a decoder 63, a synchronization detecting unit 64, an end detecting unit 65, ID detecting units 66 and 70, an encoder 67, a timing management unit 68, memories 69 and 82, a correspondence detecting unit 71, a data outputting unit 80, and an output management unit 81.

The head 60, the reproducing circuit 61, the data-write driving unit 62, the decoder 63, the synchronization detecting unit 64 and the ID detecting unit 66 correspond to the head 10, the reproducing circuit 11, the data-write driving unit 12, the decoder 13, the synchronization detecting unit 14 and the ID detecting unit 16, that are shown in FIG. 1, respectively. Therefore, their descriptions are omitted.

The head 60, the data-write driving unit 62 and the encoder 67 function together as data writing means for writing data having a fixed unit length in a recording medium, by dispersing and rearranging the data based on a fixed rule. The end detecting unit 65 functions as interrupted-location obtaining means for obtaining an interrupted location of data recorded on the recording medium when a data recording process is interrupted.

The ID detecting units 66 and 70 function together as information obtaining means for obtaining interrupted-data information, identification information, and recorded-data information. The interrupted-data information indicates contents of data whose data recording process is interrupted. The identification information indicates identification of the recording medium. Additionally, the recorded-data information indicates contents of data recorded on the recording medium.

The memories 69 and 82, and the output management unit 81 function together as information/location storing means for storing the interrupted-data information, the identification information and the recorded-data information obtained by the information obtaining means, and the interrupted location obtained by the interrupted-location obtaining means, by relating the interrupted-data information, the identification information and the recorded-data information to the interrupted location.

The encoder 67, the timing management unit 68, the correspondence detecting unit 71 and the like function as dispersing/rearranging means for confirming that the recording medium, on which the data recording process is interrupted, is installed, based on the identification information stored in the information/location storing means, and dispersing and rearranging data corresponding to the interrupted-data information and the recorded-data information stored in the information/location storing means, at the time of resuming the data recording process.

The head 60, the data-write driving unit 62 and the encoder 67 function together as data adding means for writing the data dispersed and rearranged by the dispersing/rearranging means, continuously from the interrupted location on the recording medium.

The information recording device 50 can add data to the recording medium without a user searching for end information about data recorded on the recording medium, in a case in which the interruption of the data recording process is not an unexpected accident, but is positive interruption by a user instruction.

The end detecting unit 65 of the information recording device 50 carries out an ending-location detecting process, based on an output (WDATA) of the encoder 67, simultaneously with the interruption of the data recording process. Functions of the end detecting unit 65 of the information recording device 50 and the end detecting unit 15 shown in FIG. 1 are almost the same. However, the end detecting unit 65 takes a recording data series WDATA as its input, instead of taking reproduced data as the input.

The end detecting unit 65 can easily recognize which data is currently being recorded on the recording medium, by observing the recording data series WDATA or internal information about the encoder 67. Thus, the end detecting unit 65 can just store a data location (END-SCT, END-FRM, END-WD) as end information, when the encoder 67 receives an interruption instruction. Accordingly, the end detecting unit 65 does not need to detect the amplitude of the RF signal.

The ID detecting unit 66 takes recording data as its input, and extracts data ID information DATA-ID from a TOC or directory information before a data recording process starts, or a TOC or directory information to be written or being written right after the data recording process starts. A method of extracting the data ID information is described above. Accordingly, the ID detecting unit 66 completes creating the data ID information DATA-ID by the time the encoder 67 receives the interruption instruction.

When the encoder 67 receives the interruption instruction, the memory 69 stores the end information and the recording-medium identification information DATA MEDIUM-ID. This memory 69 is preferably a non-volatile memory for simplifying resumption of the data recording process even after the information recording device 50 is powered off.

The above-described interruption instruction may be supplied to the encoder 67 positively by a user, in a case in which the data recording process cannot be continued for some reason, or in a case in which the user does not wish to continue the data recording process. Additionally, there is a case in which a task managing program of a host computer not shown in the figures decides that the data recording process cannot be continued, and interrupts the data recording process. In any cases, the interruption instruction should be supplied to the encoder 67 before the information recording device 50 is reset or powered off.

A description will now be given of a process to resume the data recording process, which is carried out by the information recording device 50. In a case in which the information recording device 50 is not turned off or not reset, or the recording medium is not switched, the information recording device 50 can take a regular process to resume the data recording process. Thus, the description of the regular process is omitted. A description will be given of the process to resume the data recording process after the information recording device 50 is turned off, or the recording medium is switched.

When a recording medium is inserted to the information recording device 50, the ID detecting unit 66 of the information recording device 50 extracts the recording-medium identification information DATA MEDIUM-ID by searching through data recorded on the recording medium. Algorithms to extract the recording-medium identification information DATA MEDIUM-ID and content information about the recording medium (data ID information) DATA-ID are preferably the same. Subsequently, the correspondence detecting unit 71 collates the recording-medium identification information DATA MEDIUM-ID extracted from the recording medium with recording-medium identification information DATA MEDIUM-ID stored in the memory 69.

FIG. 14 is a diagram showing a format of contents recorded in the memory 69. The format shown in FIG. 14 achieves management of a plurality of recording-medium identification information DATA MEDIUM-ID. For example, if the recording-medium identification information DATA MEDIUM-ID is "ID1", the ending location is indicated as the sector 101 (the end sector), the frame 1 (the end frame) and the word 3 (the end word). Additionally, if the recording-medium identification information is "ID2", the ending location is indicated as the sector 7000 (the end sector), the frame 2 (the end frame), and the word 1 (the end word).

If the correspondence detecting unit 71 determines that the recording-medium identification information DATA MEDIUM-ID extracted from the recording medium corresponds to recording-medium identification information DATA MEDIUM-ID that has an ID inserted thereto, and is stored in the memory 69, end information that corresponds to the recording-medium identification information DATA MEDIUM-ID and is stored in the memory 69 is determined as the end information about the recording medium currently inserted to the information recording device 50. Accordingly, the information recording device 50 does not need to find an ending location of data recorded on the recording medium by searching through the recording medium, and, thus, does not need to include a circuit for finding the ending location. In addition, the information recording device 50 does not take extra time to find the ending location when recording data on the recording medium.

After deciding the recording-medium identification information DATA MEDIUM-ID in the memory 69, that corresponds to the recording-medium identification information DATA MEDIUM-ID extracted from the recording medium, the correspondence detecting unit 71 transmits an instruction "HIT" to the timing management unit 68 to permit usage of the end information stored in the memory 69. Meanwhile, the recording-medium identification information DATA MEDIUM-ID extracted or detected by the ID detecting unit 66 is supplied to the output management unit 81.

The memory 82 includes an end-information table that has a format shown in FIG. 14, and stores end information when the data recording process is interrupted. In detail, the memory 82 does not need to store end information that is smaller than a sector length.

Consequently, the output management unit 81 determines an end sector of an ID corresponding to the recording-medium identification information DATA MEDIUM-ID notified from the ID detecting unit 66, or a sector that is two sectors ahead of the end sector, as a sector from which the data recording process is resumed.

Additionally, the memory 82 stores projects having a format shown in FIG. 10, by relating the projects to the recording-medium identification information DATA MEDIUM-ID. Therefore, the sector from which the data recording process is resumed and the project that correspond to the recording-medium identification information DATA MEDIUM-ID are determined in the memory 82. Therefore, the data outputting unit 80 outputs data to be added to data already recorded on the recording medium, from the memory 82, to the encoder 67. The encoder 67 carries out the above-described interleaving process and data recording process to the data, thereby adding the data to the recording medium.

As described above, the information recording device 50 according to the sixth embodiment does not need to find the end information when the recording medium is inserted. Thus, the information recording device 50 can reduce a cost of manufacturing the device, and can resume the data recording process in a short period.

Additionally, the information recording device 50 can automatically detect a location and a recording medium on which the data recording process in interrupted, and, thus, can easily resume the data recording process and output restored data when a certain period passes after the interruption of the data recording process. Additionally, the information recording device 50 eliminates a selection error of a recording medium and restored data. Furthermore, the information recording device 50 can specify a data location to resume the data recording process easily and accurately.

A description will now be given of a recording medium storing an information recording program, according to a seventh embodiment of the present invention.

An information recording program that executes the above-described information recording process performed by the information recording device 50 is stored in a recording medium such as a floppy disk or an optical disk, and is installed in an information recording device such as a general personal computer through the recording medium. The above-described information recording process can be performed by operating the information recording program by use of a control unit of the information recording device, which is a functional unit composed of a micro computer including a CPU, a ROM, a RAM and the like.

In other words, the recording medium not shown in the figures such as the floppy disk or the optical disk corresponds to a recording medium readable by a computer. The recording medium readable by the computer stores an information recording program that enables the computer to have a data writing function to write data having a fixed unit length in a recording medium, by dispersing and rearranging the data based on a fixed rule.

The information recording program also enables the computer to have an interrupted-location obtaining function to obtain an interrupted location of data recorded on the recording medium when a data recording process is interrupted.

The information recording program also enables the computer to have an information obtaining function to obtain interrupted-data information that indicates contents of data whose data recording process is interrupted, identification information about the recording medium, and recorded-data information that indicates contents of the data recorded on the recording medium.

The information recording program also enables the computer to have an information/location storing function to store the interrupted-data information, the identification information and the recorded-data information obtained by the information obtaining function, and the interrupted location obtained by the interrupted-location obtaining function, by relating the interrupted-data information, the identification information and the recorded-data information to the interrupted location.

The information recording program also enables the computer to have a dispersing/rearranging function to confirm that the recording medium, on which the data recording process is interrupted, is installed, based on the identification information stored in the information/location storing function, and dispersing and rearranging data corresponding to the interrupted-data information and the recorded-data information stored in the information/location storing function, at the time of resuming the data recording process.

The information recording program also enables the computer to have a data adding function to write the data dispersed and rearranged by the dispersing/rearranging function, continuously from the interrupted location on the recording medium.

The information recording device, that is, a computer to which the above-described information recording program is installed, obtains an interrupted location of data recorded on a recording medium, when interrupting a data recording process to write data having a fixed unit length in a recording medium by dispersing and rearranging the data based on a fixed rule. Additionally, the information recording device obtains interrupted-data information that indicates contents of data whose data recording process is interrupted, identification information about the recording medium, and recorded-data information that indicates contents of the data recorded on the recording medium.

Subsequently, the information recording device stores the interrupted-data information, the identification information, the recorded-data information, and the interrupted location, by relating the interrupted-data information, the identification information and the recorded-data information to the interrupted location.

The information recording device confirms that the recording medium, on which the data recording process is interrupted, is installed, based on the identification information. The information recording device, then, disperses and rearranges data corresponding to the interrupted-data information and the recorded-data information, at the time of resuming the data recording process. Subsequently, the information recording device writes the dispersed and rearranged data, continuously from the interrupted location on the recording medium.

By use of the recording medium readable by the computer and storing the information recording program according to the seventh embodiment, the above-described information-recording process can be easily introduced to a normal computer.

Figure 15:
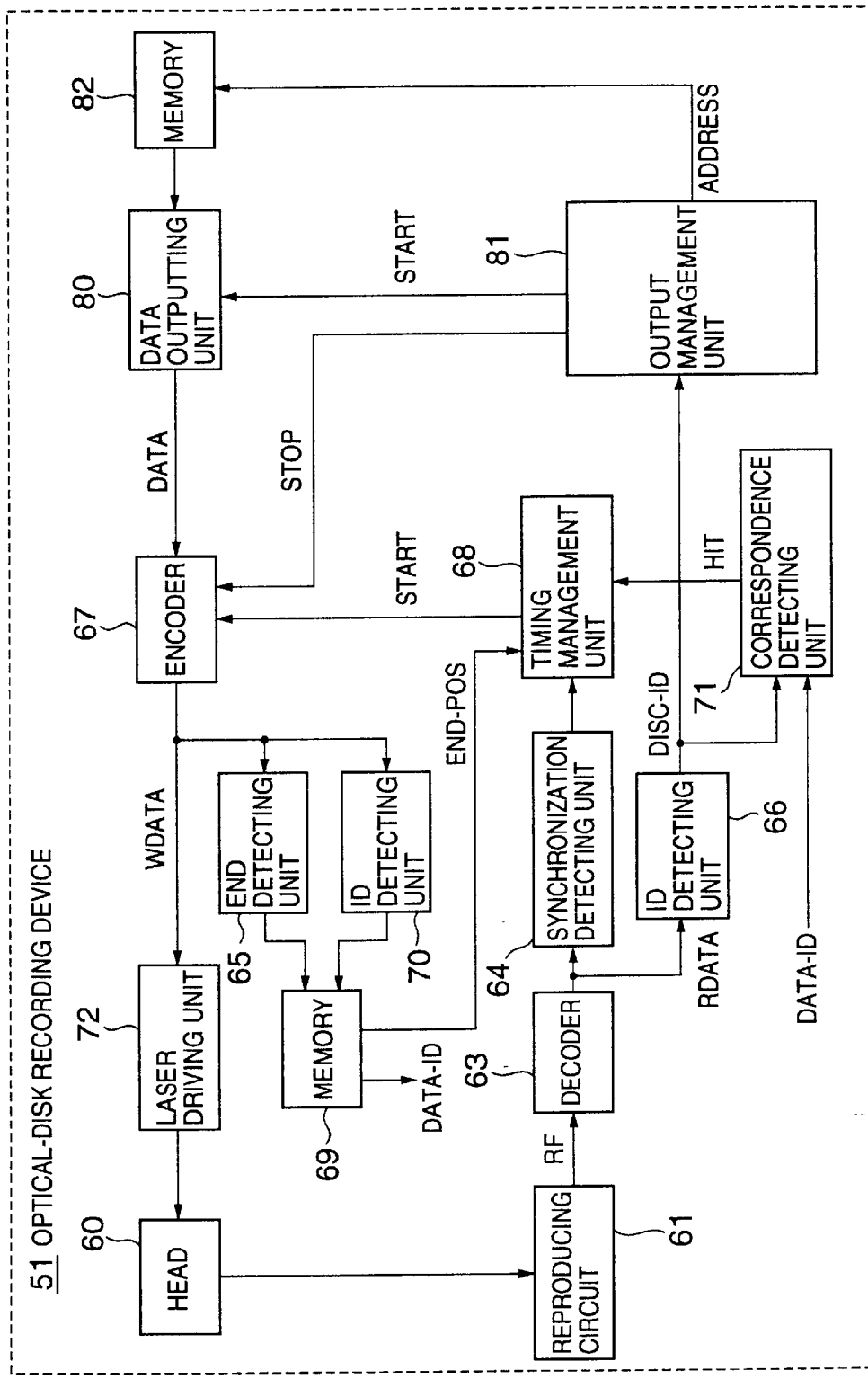
FIG. 15 is a block diagram showing a structure of an optical-disk recording device according to an eighth embodiment of the present invention.

A description will now be given of an optical-disk recording device according to an eighth embodiment of the present invention, with reference to FIG. 15. FIG. 15 is a block diagram showing a structure of an optical-disk recording device 51 according to the eighth embodiment of the present invention.

The optical-disk recording device 51 shown in FIG. 15 includes the head 60, the reproducing circuit 61, a laser driving unit 72, the decoder 63, the synchronization detecting unit 64, the end detecting unit 65, the ID detecting units 66 and 70, the encoder 67, the timing management unit 68, the memories 69 and 82, the correspondence detecting unit 71, the data outputting unit 80, and the output management unit 81.

The head 60, the reproducing circuit 61, the laser driving unit 72, the decoder 63, the synchronization detecting unit 64 and the ID detecting unit 66 correspond to the head 10, the reproducing circuit 11, the laser driving unit 20, the decoder 13, the synchronization detecting unit 14 and the ID detecting unit 16, that are shown in FIG. 6, respectively. Therefore, their descriptions are omitted.

The head 60, the laser driving unit 72 and the encoder 67 function together as data writing means for writing data having a sector length on an optical disk, by interleaving the data. The end detecting unit 65 functions as interrupted-location obtaining means for obtaining an interrupted location of data recorded on the optical disk when a data recording process is interrupted.

The ID detecting units 66 and 70 function together as information obtaining means for obtaining interrupted-data information, identification information, and recorded-data information. The interrupted-data information indicates contents of data whose data recording process is interrupted. The identification information indicates identification of the optical disk. Additionally, the recorded-data information indicates contents of the data recorded on the optical disk.

The memories 69 and 82, and the output management unit 81 function together as information/location storing means for storing the interrupted-data information, the identification information and the recorded-data information obtained by the information obtaining means, and the interrupted location obtained by the interrupted-location obtaining means, by relating the interrupted-data information, the identification information and the recorded-data information to the interrupted location.

The encoder 67, the timing management unit 68, the correspondence detecting unit 71 and the like function as interleaving means for confirming that the optical disk, on which the data recording process is interrupted, is installed, based on the identification information stored in the information/location storing means, and interleaving data corresponding to the interrupted-data information and the recorded-data information stored in the information/location storing means, at the time of resuming the data recording process.

The head 60, the laser driving unit 72 and the encoder 67 function together as data adding means for writing the data interleaved by the interleaving means, continuously from the interrupted location on the optical disk.

The optical-disk recording device 51 can add data to the optical disk without a user searching for end information about data recorded on the optical disk, in a case in which the interruption of the data recording process is not an unexpected accident, but is positive interruption by a user instruction.

The end detecting unit 65 of the optical-disk recording device 51 carries out an ending-location detecting process, based on an output (WDATA) of the encoder 67, simultaneously with the interruption of the data recording process. Functions of the end detecting unit 65 of the optical-disk recording device 51 and the end detecting unit 15 shown in FIG. 6 are almost the same. However, the end detecting unit 65 takes a recording data series WDATA as its input, instead of taking reproduced data as the input.

The end detecting unit 65 can easily recognize which data is currently being recorded on the optical disk, by observing the recording data series WDATA or internal information about the encoder 67. Thus, the end detecting unit 65 can just store a data location (END-SCT, END-FRM, END-WD) as end information, when the encoder 67 receives an interruption instruction. Accordingly, the end detecting unit 65 does not need to detect the amplitude of the RF signal.

The ID detecting unit 66 takes recording data as its input, and extracts data ID information DATA-ID from a TOC or directory information before a data recording process starts, or a TOC or directory information to be written or being written right after the data recording process starts. A method of extracting the data ID information is described above. Accordingly, the ID detecting unit 66 completes creating the data ID information DATA-ID by the time the encoder 67 receives the interruption instruction.

When the encoder 67 receives the interruption instruction, the memory 69 stores the end information and the optical-disk identification information DISC-ID. This memory 69 is preferably a non-volatile memory for simplifying resumption of the data recording process even after the optical-disk recording device 51 is powered off.

The above-described interruption instruction may be supplied to the encoder 67 positively by a user, in a case in which the data recording process cannot be continued for some reason, or in a case in which the user does not wish to continue the data recording process. Additionally, there is a case in which a task managing program of a host computer not shown in the figures decides that the data recording process cannot be continued, and interrupts the data recording process. In any cases, the interruption instruction should be supplied to the encoder 67 before the optical-disk recording device 51 is reset or powered off.

A description will now be given of a process to resume the data recording process, which is carried out by the optical-disk recording device 51. In a case in which the optical-disk recording device 51 is not turned off or not reset, or the optical disk is not switched, the optical-disk recording device 51 can take a regular process to resume the data recording process. Thus, the description of the regular process is omitted. A description will be given of the process to resume the data recording process after the optical-disk recording device 51 is turned off, or the optical disk is switched.

When an optical disk is inserted to the optical-disk recording device 51, the ID detecting unit 66 of the optical-disk recording device 51 extracts the optical-disk identification information DISC-ID by searching through data recorded on the optical disk. Algorithms to extract the optical-disk identification information DISC-ID and content information about the optical disk (data ID information) DATA-ID are preferably the same. Subsequently, the correspondence detecting unit 71 collates the optical-disk identification information DISC-ID extracted from the optical disk with optical-disk identification information DISC-ID stored in the memory 69. The format of the memory 69 is shown in FIG. 14, and a description about the format of the memory 69 is omitted in this embodiment.

If the correspondence detecting unit 71 determines that the optical-disk identification information DISC-ID extracted from the optical disk corresponds to optical-disk identification information DISC-ID that has an ID inserted thereto, and is stored in the memory 69, end information that corresponds to the optical-disk identification information DISC-ID and is stored in the memory 69 is determined as the end information about the optical disk currently inserted to the optical-disk recording device 51. Accordingly, the optical-disk recording device 51 does not need to find an ending location of data recorded on the optical disk by searching through the recording medium, and, thus, does not need to include a circuit for finding the ending location. In addition, the optical-disk recording device 51 does not take extra time to find the ending location when recording data on the optical disk.

After deciding the optical-disk identification information DISC-ID in the memory 69, that corresponds to the optical-disk identification information DISC-ID extracted from the optical disk, the correspondence detecting unit 71 transmits an instruction "HIT" to the timing management unit 68 to permit usage of the end information stored in the memory 69. Meanwhile, the optical-disk identification information DISC-ID extracted or detected by the ID detecting unit 66 is supplied to the output management unit 81.

The memory 82 includes an end-information table that has a format shown in FIG. 14, and stores end information when the data recording process is interrupted. In detail, the memory 82 does not need to store end information that is smaller than a sector length.

Consequently, the output management unit 81 determines an end sector of an ID corresponding to the optical-disk identification information DISC-ID notified from the ID detecting unit 66, or a sector that is two sectors ahead of the end sector, as a sector from which the data recording process is resumed.

Additionally, the memory 82 stores projects having a format shown in FIG. 10, by relating the projects to the optical-disk identification information DISC-ID. Therefore, the sector from which the data recording process is resumed and the project that correspond to the optical-disk identification information DISC-ID are determined in the memory 82. Therefore, the data outputting unit 80 outputs data to be added to data already recorded on the optical disk, from the memory 82, to the encoder 67. The encoder 67 carries out the above-described interleaving process and data recording process to the data, thereby adding the data to the optical disk.

As described above, the optical-disk recording device 51 according to the eighth embodiment does not need to find the end information when the optical disk is inserted. Thus, the optical-disk recording device 51 can reduce a cost of manufacturing the device, and can resume the data recording process in a short period.

Additionally, the optical-disk recording device 51 can automatically detect a location and an optical disk on which the data recording process in interrupted, and, thus, can easily resume the data recording process and output restored data when a certain period passes after the interruption of the data recording process. Additionally, the optical-disk recording device 51 eliminates a selection error of an optical disk and restored data. Furthermore, the optical-disk recording device 51 can specify a data location to resume the data recording process easily and accurately.

Figure 16:
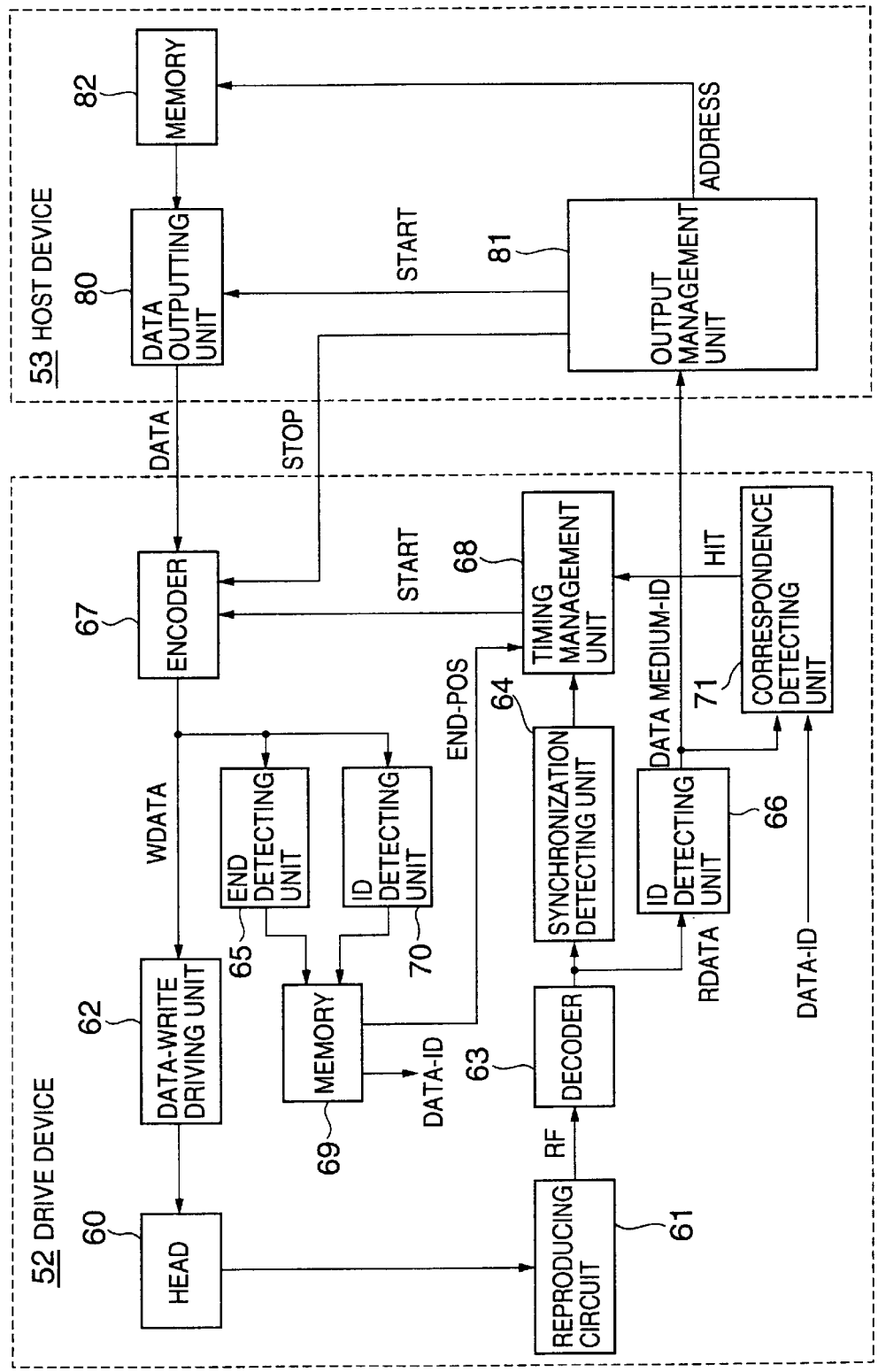
FIG. 16 is a block diagram showing a structure of an information recording system according to a ninth embodiment of the present invention.

A description will now be given of an information recording system according to a ninth embodiment of the present invention, with reference to FIG. 16. FIG. 16 is a block diagram showing a structure of the information recording system according to the ninth embodiment. A unit shown in FIG. 16 corresponding to a unit shown in FIG. 13 has the same unit number as the unit shown in FIG. 13.

The information recording system shown in FIG. 16 includes a drive device 52 and a host device 53. The drive device 52 is, for instance, a CD-R/CD-RW driving device that writes data in a recording medium by dispersing and rearranging the data based on a fixed rule, in which the data has a fixed unit length and is outputted by the host device 53. The host device 53 is an upper-level device such as a personal computer that outputs the data to be recorded on the recording medium, which is installed in the drive device 52. The drive device 52 and the host device 53 are connected to each other through an interface such as the SCSI, the ATAPI, or the USB.

The host device 53 is a microcomputer that is composed of a CPU, a ROM and a RAM, for instance, and includes the data outputting unit 80, the output management unit 81 and the memory 82.

The drive device 52 includes the head 60, the reproducing circuit 61, the data-write driving unit 62, the decoder 63, the synchronization detecting unit 64, the end detecting unit 65, the ID (Identification) detecting units 66 and 70, the encoder 67, the timing management unit 68, the memory 69 and the correspondence detecting unit 71.

The head 60, the reproducing circuit 61, the data-write driving unit 62, the decoder 63, the synchronization detecting unit 64 and the ID detecting unit 66 correspond to the head 10, the reproducing circuit 11, the data-write driving unit 12, the decoder 13, the synchronization detecting unit 14 and the ID detecting unit 16, that are shown in FIG. 1, respectively. Therefore, their descriptions are omitted.

The head 60, the data-write driving unit 62 and the encoder 67 function together as data writing means for writing data having a fixed unit length in a recording medium, by dispersing and rearranging the data based on a fixed rule. The end detecting unit 65 functions as interrupted-location obtaining means for obtaining an interrupted location of data recorded on the recording medium when a data recording process is interrupted.

The ID detecting units 66 and 70 function together as information obtaining means for obtaining interrupted-data information, identification information, and recorded-data information. The interrupted-data information indicates contents of data whose data recording process is interrupted. The identification information indicates identification of the recording medium. Additionally, the recorded-data information indicates contents of data recorded on the recording medium.

The memories 69 and 82, and the output management unit 81 function together as information/location storing means for storing the interrupted-data information, the identification information and the recorded-data information obtained by the information obtaining means, and the interrupted location obtained by the interrupted-location obtaining means, by relating the interrupted-data information, the identification information and the recorded-data information to the interrupted location.

The encoder 67, the timing management unit 68, the correspondence detecting unit 71 and the like function as dispersing/rearranging means for confirming that the recording medium, on which the data recording process is interrupted, is installed, based on the identification information stored in the information/location storing means, and dispersing and rearranging data corresponding to the interrupted-data information and the recorded-data information stored in the information/location storing means, at the time of resuming the data recording process.

The head 60, the data-write driving unit 62 and the encoder 67 function together as data adding means for writing the data dispersed and rearranged by the dispersing/rearranging means, continuously from the interrupted location on the recording medium.

The information recording system according to the ninth embodiment can add data to the recording medium without a user searching for end information about data recorded on the recording medium, in a case in which the interruption of the data recording process is not an unexpected accident, but is positive interruption by a user instruction. The end detecting unit 65 of the drive device 52 carries out an ending-location detecting process, based on an output (WDATA) of the encoder 67, simultaneously with the interruption of the data recording process.

A description will now be given of a process to resume the data recording process, which is carried out by the information recording system. In a case in which the information recording system is not turned off or not reset, or the recording medium is not switched, the information recording system can take a regular process to resume the data recording process. Thus, the description of the regular process is omitted. A description will be given of the process to resume the data recording process after the information recording system is turned off, or the recording medium is switched.

When a recording medium is inserted to the drive device 52, the ID detecting unit 66 of the drive device 52 extracts the recording-medium identification information DATA MEDIUM-ID by searching through data recorded on the recording medium. Algorithms to extract the recording-medium identification information DATA MEDIUM-ID and content information about the recording medium (data ID information) DATA-ID are preferably the same. Subsequently, the correspondence detecting unit 71 collates the recording-medium identification information DATA MEDIUM-ID extracted from the recording medium with recording-medium identification information DATA MEDIUM-ID stored in the memory 69. The format of the memory 69 is shown in FIG. 14, and, thus, a description about the format of the memory 69 is omitted in this embodiment.

If the correspondence detecting unit 71 determines that the recording-medium identification information DATA MEDIUM-ID extracted from the recording medium corresponds to recording-medium identification information DATA MEDIUM-ID that has an ID inserted thereto, and is stored in the memory 69, end information that corresponds to the recording-medium identification information DATA MEDIUM-ID and is stored in the memory 69 is determined as the end information about the recording medium currently inserted to the drive device 52. Accordingly, the information recording system does not need to find an ending location of data recorded on the recording medium by searching through the recording medium, and, thus, does not need to include a circuit for finding the ending location. In addition, the information recording system does not take extra time to find the ending location when recording data on the recording medium.

After deciding the recording-medium identification information DATA MEDIUM-ID in the memory 69, that corresponds to the recording-medium identification information DATA MEDIUM-ID extracted from the recording medium, the correspondence detecting unit 71 transmits an instruction "HIT" to the timing management unit 68 to permit usage of the end information stored in the memory 69. Meanwhile, the recording-medium identification information DATA MEDIUM-ID extracted or detected by the ID detecting unit 66 is supplied to the output management unit 81 of the host device 53.

The memory 82 includes an end-information table that has a format shown in FIG. 14, and stores end information when the data recording process is interrupted. In detail, the memory 82 does not need to store end information that is smaller than a sector length.

Consequently, the output management unit 81 of the host device 53 determines an end sector of an ID corresponding to the recording-medium identification information DATA MEDIUM-ID notified from the ID detecting unit 66, or a sector that is two sectors ahead of the end sector, as a sector from which the data recording process is resumed.

Additionally, the memory 82 of the host device 53 stores projects having a format shown in FIG. 10, by relating the projects to the recording-medium identification information DATA MEDIUM-ID. Therefore, the sector from which the data recording process is resumed and the project that correspond to the recording-medium identification information DATA MEDIUM-ID are determined in the memory 82. Therefore, the data outputting unit 80 outputs data to be added to data already recorded on the recording medium, from the memory 82, to the encoder 67 of the drive device 52. The encoder 67 carries out the above-described interleaving process and data recording process to the data, thereby adding the data to the recording medium.

As described above, the information recording system according to the ninth embodiment does not need to find the end information when the recording medium is inserted. Thus, the information recording system can reduce a cost of manufacturing the device, and can resume the data recording process in a short period.

Additionally, the information recording system can automatically detect a location and a recording medium on which the data recording process in interrupted, and, thus, can easily resume the data recording process and output restored data when a certain period passes after the interruption of the data recording process. Additionally, the information recording system eliminates a selection error of a recording medium and restored data. Furthermore, the information recording system can specify a data location to resume the data recording process easily and accurately.

Figure 17:
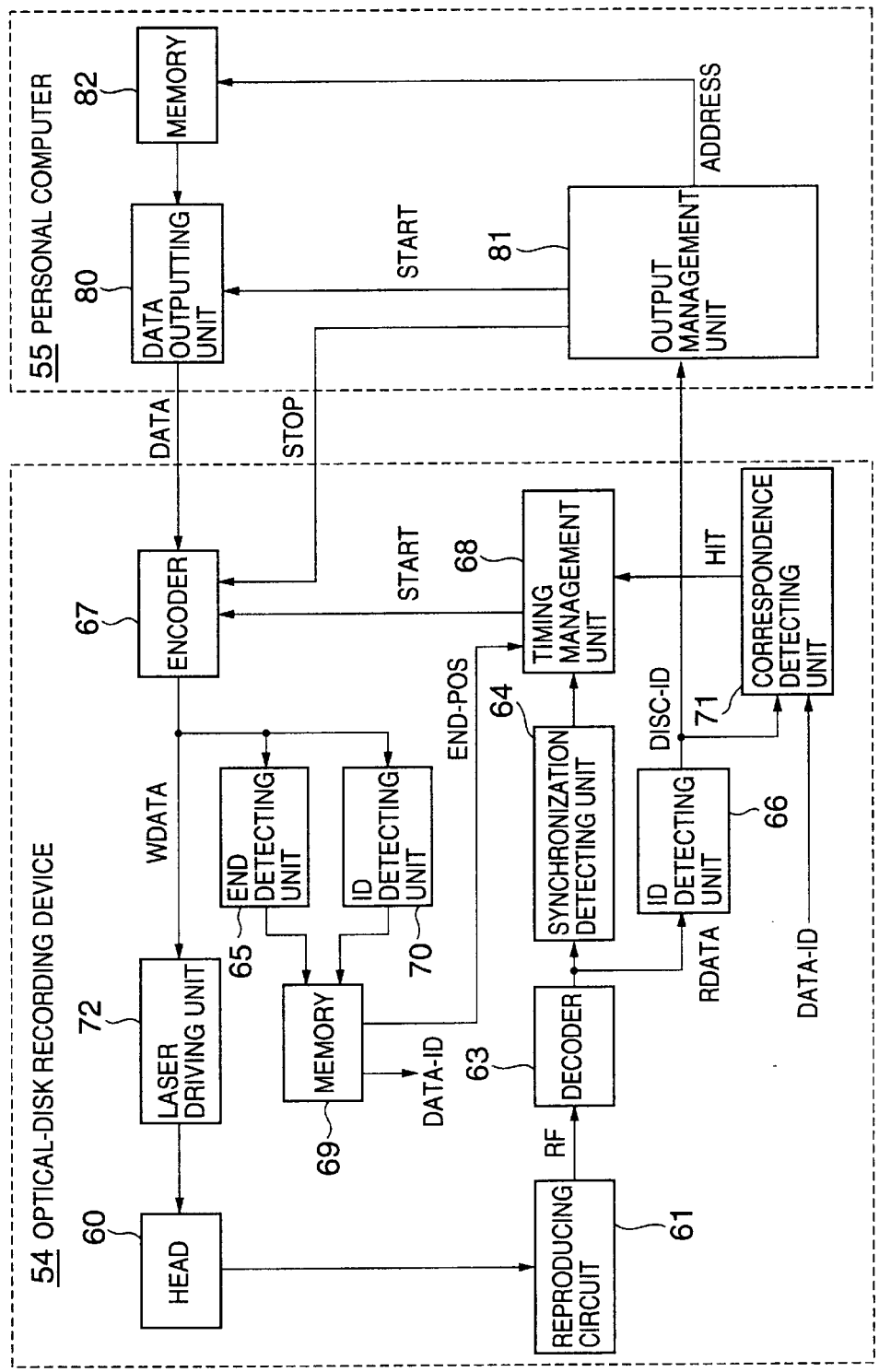
FIG. 17 is a block diagram showing a structure of an optical-disk recording system according to a tenth embodiment of the present invention.

A description will now be given of an optical-disk recording system according to a tenth embodiment of the present invention, with reference to FIG. 17. FIG. 17 is a block diagram showing a structure of the optical-disk recording system according to the tenth embodiment. A unit shown in FIG. 17 corresponding to a unit shown in FIG. 15 has the same unit number as the unit shown in FIG. 15.

The optical-disk recording system shown in FIG. 17 includes an optical-disk recording device 54 and a personal computer 55. The optical-disk recording device 54 is, for instance, a CD-R/CD-RW driving device that writes data on an optical disk by interleaving the data based on a fixed rule, in which the data has a fixed unit length and is outputted by the personal computer 55. The personal computer 55 outputs the data to be recorded on the optical disk, which is installed in the optical-disk recording device 54. The optical-disk recording device 54 and the personal computer 55 are connected to each other through an interface such as the SCSI, the ATAPI, or the USB.

The personal computer 55 is a microcomputer that is composed of a CPU, a ROM and a RAM, for instance, and includes the data outputting unit 80, the output management unit 81 and the memory 82.

The optical-disk recording device 54 includes the head 60, the reproducing circuit 61, the laser driving unit 72, the decoder 63, the synchronization detecting unit 64, the end detecting unit 65, the ID (Identification) detecting units 66 and 70, the encoder 67, the timing management unit 68, the memory 69 and the correspondence detecting unit 71.

The head 60, the reproducing circuit 61, the laser driving unit 72, the decoder 63, the synchronization detecting unit 64 and the ID detecting unit 66 correspond to the head 10, the reproducing circuit 11, the laser driving unit 20, the decoder 13, the synchronization detecting unit 14 and the ID detecting unit 16, that are shown in FIG. 6, respectively. Therefore, their descriptions are omitted.

The head 60, the laser driving unit 72 and the encoder 67 function together as data writing means for writing data having a sector length on a optical disk, by interleaving the data. The end detecting unit 65 functions as interrupted-location obtaining means for obtaining an interrupted location of data recorded on the optical disk when a data recording process is interrupted.

The ID detecting units 66 and 70 function together as information obtaining means for obtaining interrupted-data information, identification information, and recorded-data information. The interrupted-data information indicates contents of data whose data recording process is interrupted. The identification information indicates identification of the optical disk. Additionally, the recorded-data information indicates contents of the data recorded on the optical disk.

The memories 69 and 82, and the output management unit 81 function together as information/location storing means for storing the interrupted-data information, the identification information and the recorded-data information obtained by the information obtaining means, and the interrupted location obtained by the interrupted-location obtaining means, by relating the interrupted-data information, the identification information and the recorded-data information to the interrupted location.

The encoder 67, the timing management unit 68, the correspondence detecting unit 71 and the like function as interleaving means for confirming that the optical disk, on which the data recording process is interrupted, is installed, based on the identification information stored in the information/location storing means, and interleaving data corresponding to the interrupted-data information and the recorded-data information stored in the information/location storing means, at the time of resuming the data recording process.

The head 60, the laser driving unit 72 and the encoder 67 function together as data adding means for writing the data interleaved by the interleaving means, continuously from the interrupted location on the optical disk.

The optical-disk recording system according to the tenth embodiment can add data to the optical disk without a user searching for end information about data recorded on the optical disk, in a case in which the interruption of the data recording process is not an unexpected accident, but is positive interruption by a user instruction. The end detecting unit 65 of the optical-disk recording device 54 carries out an ending-location detecting process, based on an output (WDATA) of the encoder 67, simultaneously with the interruption of the data recording process.

A description will now be given of a process to resume the data recording process, which is carried out by the optical-disk recording system. In a case in which the optical-disk recording system is not turned off or not reset, or the optical disk is not switched, the optical-disk recording system can take a regular process to resume the data recording process. Thus, the description of the regular process is omitted. A description will be given of the process to resume the data recording process after the optical-disk recording system is turned off, or the optical disk is switched.

When an optical disk is inserted to the optical-disk recording device 54, the ID detecting unit 66 of the optical-disk recording device 54 extracts the optical-disk identification information DISC-ID by searching through data recorded on the optical disk. Algorithms to extract the optical-disk identification information DISC-ID and content information about the optical disk (data ID information) DATA-ID are preferably the same. Subsequently, the correspondence detecting unit 71 collates the optical-disk identification information DISC-ID extracted from the optical disk with optical-disk identification information DISC-ID stored in the memory 69. The format of the memory 69 is shown in FIG. 14, and, thus, a description about the format of the memory 69 is omitted in this embodiment.

If the correspondence detecting unit 71 determines that the optical-disk identification information DISC-ID extracted from the optical disk corresponds to optical-disk identification information DISC-ID that has an ID inserted thereto, and is stored in the memory 69, end information that corresponds to the optical-disk identification information DISC-ID and is stored in the memory 69 is determined as the end information about the optical disk currently inserted to the optical-disk recording device 54. Accordingly, the optical-disk recording system does not need to find an ending location of data recorded on the optical disk by searching through the recording medium, and, thus, does not need to include a circuit for finding the ending location. In addition, the optical-disk recording system does not take extra time to find the ending location when recording data on the optical disk.

After deciding the optical-disk identification information DISC-ID in the memory 69, that corresponds to the optical-disk identification information DISC-ID extracted from the optical disk, the correspondence detecting unit 71 transmits an instruction "HIT" to the timing management unit 68 to permit usage of the end information stored in the memory 69. Meanwhile, the optical-disk identification information DISC-ID extracted or detected by the ID detecting unit 66 is supplied to the output management unit 81 of the personal computer 55.

The memory 82 includes an end-information table that has a format shown in FIG. 14, and stores end information when the data recording process is interrupted. In detail, the memory 82 does not need to store end information that is smaller than a sector length.

Consequently, the output management unit 81 of the personal computer 55 determines an end sector of an ID corresponding to the optical-disk identification information DISC-ID notified from the ID detecting unit 66, or a sector that is two sectors ahead of the end sector, as a sector from which the data recording process is resumed.

Additionally, the memory 82 of the personal computer 55 stores projects having a format shown in FIG. 10, by relating the projects to the optical-disk identification information DISC-ID. Therefore, the sector from which the data recording process is resumed and the project that correspond to the optical-disk identification information DISC-ID are determined in the memory 82. Therefore, the data outputting unit 80 outputs data to be added to data already recorded on the optical disk, from the memory 82, to the encoder 67 of the optical-disk recording device 54. The encoder 67 carries out the above-described interleaving process and data recording process to the data, thereby adding the data to the optical disk.

As described above, the optical-disk recording system according to the tenth embodiment does not need to find the end information when the optical disk is inserted. Thus, the optical-disk recording system can reduce a cost of manufacturing the device, and can resume the data recording process in a short period.

Additionally, the optical-disk recording system can automatically detect a location and a optical disk on which the data recording process in interrupted, and, thus, can easily resume the data recording process and output restored data when a certain period passes after the interruption of the data recording process. Additionally, the optical-disk recording system eliminates a selection error of an optical disk and restored data. Furthermore, the optical-disk recording system can specify a data location to resume the data recording process easily and accurately.

In conclusion, the even if a data recording process to a recording medium is interrupted because of a power off or a hardware reset, the data recording process can be resumed, and data recorded on the recording medium can be completely reproduced, by use of the information recording device, the information recording method, the recording medium storing the information recording program, the optical-disk recording device, the optical-disk recording method, the information recording system, and the optical-disk recording system.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-153133, filed on May 24, 2000, the entire contents of which are hereby incorporated by reference.

What is claimed is:

1. An information recording device, comprising:
   a data writing unit writing data having a fixed unit length in a recording medium, by dispersing and rearranging the data based on a fixed rule;
   an ending-location detecting unit detecting an ending location of the data written in the recording medium;
   a starting-location deciding unit deciding a starting location in the recording medium to start dispersing and rearranging the data, based on said ending location;
   a dispersing/rearranging unit dispersing and rearranging additional data, by starting from said starting location; and a data adding unit writing the additional data dispersed and rearranged by said dispersing/rearranging unit, continuously from said ending location in the recording medium.

2. The information recording device as claimed in claim 1, further comprising a synchronizing unit synchronizing a data-write timing to a reproducing timing of the data written in the recording medium until just before writing said additional data in the recording medium.

3. The information recording device as claimed in claim 1, further comprising an information creating unit creating content information that indicates contents of the data written in the recording medium.

4. The information recording device as claimed in claim 3, wherein said content information is index information.

5. The information recording device as claimed in claim 1, wherein said fixed unit length is a sector length.

6. The information recording device as claimed in claim 1, wherein said data writing unit writes the data having the fixed unit length in the recording medium, by interleaving the data, and said dispersing/rearranging unit interleaves the additional data, by starting from said starting location.

7. The information recording device as claimed in claim 1, wherein said starting location is at least an interleaving length away from said ending location.

8. A method of recording information in a recording medium, comprising the steps of:
  writing data having a sector length in the recording medium by interleaving the data;
  detecting an ending location of the data written in the recording medium;
  deciding a location that is at least an interleaving length away from said ending location as a starting location for interleaving the data;
  interleaving additional data by starting from said starting location; and
  writing said additional data in the recording medium continuously from said ending location.

9. The method as claimed in claim 8, further comprising the step of synchronizing a data-write timing to a reproducing timing of the data written in the recording medium until just before writing said additional data in the recording medium.

10. The method as claimed in claim 8, further comprising the step of creating content information that indicates contents of the data written in the recording medium.

11. A recording medium readable by a computer, tangibly embodying a program of instructions executable by the computer to write data in a recording medium, wherein said program includes the steps of:
  writing data having a fixed unit length in the recording medium, by dispersing and rearranging the data based on a fixed rule;
  detecting an ending location of the data written in the recording medium;
  deciding a starting location in the recording medium to start dispersing and rearranging the data, based on said ending location;
  dispersing and rearranging additional data, by starting from said starting location;
  writing said additional data continuously from said ending location in the recording medium;
  synchronizing a data-write timing to a reproducing timing of the data written in the recording medium until just before writing said additional data in the recording medium; and
  creating content information that indicates contents of the data written in the recording medium.

12. An optical-disk recording device, comprising:
  a data writing unit interleaving data that has a sector length, and writing the data on an optical disk by emitting laser light onto the optical disk;
  an ending-location detecting unit detecting an ending location of the data written on the optical disk;
  a starting-location deciding unit deciding a location that is at least an interleaving length away from said ending location as a starting location for interleaving the data;
  an interleaving unit interleaving additional data, by starting from said starting location; and
  a data adding unit writing the additional data interleaved by said interleaving unit, continuously from said ending location on the optical disk.

13. The optical-disk recording device as claimed in claim 12, further comprising a synchronizing unit synchronizing a data-write timing to a reproducing timing of the data written on the optical disk until just before writing said additional data on the optical disk.

14. The optical-disk recording device as claimed in claim 12, further comprising an information creating unit creating content information that indicates contents of the data written on the optical disk.

15. The optical-disk recording device as claimed in claim 14, wherein said content information is index information.

16. A method of recording information on an optical disk, comprising the steps of:
  interleaving data having a sector length;
  writing the data on the optical disk by emitting laser light onto the optical disk;
  detecting an ending location of the data written on the optical disk;
  deciding a location that is at least an interleaving length away from said ending location as a starting location for interleaving the data;
  interleaving additional data by starting from said starting location; and
  writing said additional data on the optical disk continuously from said ending location.

17. The method as claimed in claim 16, further comprising the step of synchronizing a data-write timing to a reproducing timing of the data written on the optical disk until just before writing said additional data on the optical disk.

18. The method as claimed in claim 16, further comprising the step of creating content information that indicates contents of the data written on the optical disk.

19. An information recording system, comprising:
  an upper-level device outputting data that has a fixed unit length; and
  an information recording device writing the data outputted by said upper-level device in a recording medium, by dispersing and rearranging the data based on a fixed rule,
  wherein said information recording device includes:
  an ending-location detecting unit detecting an ending location of the data written in the recording medium;
  a starting-location deciding unit deciding a starting location in the recording medium to start dispersing and rearranging the data, based on said ending location;
  a dispersing/rearranging unit dispersing and rearranging additional data that is outputted from said upper-level device, by starting from said starting location; and a data adding unit writing the additional data dispersed and rearranged by said dispersing/rearranging unit, continuously from said ending location in the recording medium.

20. The information recording system as claimed in claim 19, wherein said information recording device further includes a synchronizing unit synchronizing a data-write timing to a reproducing timing of the data written in the recording medium until just before writing said additional data in the recording medium.

21. The information recording system as claimed in claim 19, wherein said information recording device further includes an information creating unit creating written-data information that indicates contents of the data written in the recording medium, and an information notifying unit notifying said upper-level device about the written-data information and ending information that indicates said ending location.

22. The information recording system as claimed in claim 21, wherein said upper-level device includes an information storing unit storing output-data information that indicates contents of the data outputted to said information recording device, and an output-data deciding unit deciding the additional data to be outputted to said information recording device by comparing said output-data information with said written-data information and said ending information.

23. An optical-disk recording system, comprising:
a computer outputting data that has a sector length; and
an optical-disk recording device interleaving the data outputted by said computer, and, then, writing the data on an optical disk by emitting laser light onto the optical disk,
wherein said optical-disk recording device includes:
an ending-location detecting unit detecting an ending location of the data written on the optical disk;
a starting-location deciding unit deciding a location that is at least an interleaving length away from said ending location as a starting location for interleaving the data;
an interleaving unit interleaving additional data that is outputted by said computer, by starting from said starting location; and
a data adding unit writing the additional data interleaved by said interleaving unit, continuously from said ending location on the optical disk.

24. The optical-disk recording system as claimed in claim 23, wherein said optical-disk recording device further includes a synchronizing unit synchronizing a data-write timing to a reproducing timing of the data written on the optical disk until just before writing said additional data on the optical disk.

25. The optical-disk recording system as claimed in claim 23, wherein said optical-disk recording device further includes an information creating unit creating written-data information that indicates contents of the data written on the optical disk, and an information notifying unit notifying said computer about the written-data information and ending information that indicates said ending location.

26. The optical-disk recording system as claimed in claim 25, wherein said computer includes an information storing unit storing output-data information that indicates contents of the data outputted to said optical-disk recording device, and an output-data deciding unit deciding the additional data to be outputted to said optical-disk recording device by comparing said output-data information with said written-data information and said ending information.

27. The optical-disk recording system as claimed in claim 23, wherein said written-data information and said output-data information is index information.

28. An information recording device, comprising:
a data writing unit writing data having a fixed unit length in a recording medium, by dispersing and rearranging the data based on a fixed rule;
an interrupted-location obtaining unit obtaining an interrupted location of the data written in the recording medium if a data writing process is interrupted;
an information obtaining unit obtaining interrupted-data information that indicates contents of the data whose data writing process is interrupted, identification information about the recording medium, and written-data information that indicates contents of the data written in the recording medium;
an information/location storing unit storing the interrupted-data information, the identification information, the written-data information and the interrupted location, by relating the interrupted-data information, the identification information, the recorded-data information and the interrupted location to each other;
a dispersing/rearranging unit confirming that the recording medium, on which the data writing process is interrupted, is installed, based on said identification information stored in said information/location storing unit, and dispersing and rearranging the data corresponding to the interrupted-data information and the recorded-data information stored in said information/location storing unit, when resuming the data writing process; and
a data adding unit writing the data dispersed and rearranged by said dispersing/rearranging unit, continuously from said interrupted location in the recording medium.

29. A method of recording information in a recording medium, comprising the steps of:
writing data having a fixed unit length in a recording medium, by dispersing and rearranging the data based on a fixed rule;
obtaining an interrupted location of the data written in the recording medium if a data writing process is interrupted;
obtaining interrupted-data information that indicates contents of the data whose data writing process is interrupted, identification information about the recording medium, and written-data information that indicates contents of the data written in the recording medium;
storing the interrupted-data information, the identification information, the written-data information and the interrupted location, by relating the interrupted-data information, the identification information, the recorded-data information and the interrupted location to each other;
confirming that the recording medium, on which the data writing process is interrupted, is installed, based on said identification information, when resuming the data writing process;
dispersing and rearranging the data corresponding to said interrupted-data information and said recorded-data information; and
writing said data continuously from said interrupted location in the recording medium.

30. A recording medium readable by a computer, tangibly embodying a program of instructions executable by the computer to write data in a recording medium, wherein said program includes the steps of:

writing data having a fixed unit length in a recording medium, by dispersing and rearranging the data based on a fixed rule;

obtaining an interrupted location of the data written in the recording medium if a data writing process is interrupted;

obtaining interrupted-data information that indicates contents of the data whose data writing process is interrupted, identification information about the recording medium, and written-data information that indicates contents of the data written in the recording medium;

storing the interrupted-data information, the identification information, the written-data information and the interrupted location, by relating the interrupted-data information, the identification information, the recorded-data information and the interrupted location to each other;

confirming that the recording medium, on which the data writing process is interrupted, is installed, based on said identification information, when resuming the data writing process;

dispersing and rearranging the data corresponding to said interrupted-data information and said recorded-data information; and writing said data continuously from said interrupted location in the recording medium.

31. An optical-disk recording device, comprising:

a data writing unit interleaving data having a sector length, and writing the data on an optical disk by emitting laser light onto the optical disk;

an interrupted-location obtaining unit obtaining an interrupted location of the data written on the optical disk if a data writing process is interrupted;

an information obtaining unit obtaining interrupted-data information that indicates contents of the data whose data writing process is interrupted, identification information about the optical disk, and written-data information that indicates contents of the data written on the optical disk;

an information/location storing unit storing the interrupted-data information, the identification information, the written-data information and the interrupted location, by relating the interrupted-data information, the identification information, the recorded-data information and the interrupted location to each other;

an interleaving unit confirming that the optical disk, on which the data writing process is interrupted, is installed, based on said identification information stored in said information/location storing unit, and interleaving the data corresponding to the interrupted-data information and the recorded-data information stored in said information/location storing unit, when resuming the data writing process; and a data adding unit writing the data interleaved by said interleaving unit, continuously from said interrupted location in the optical disk.

32. A method of recording information on an optical disk, comprising the steps of:

interleaving data having a sector length;

writing the data on the optical disk by emitting laser light onto the optical disk;

obtaining an interrupted location of the data written on the optical disk if a data writing process is interrupted;

obtaining interrupted-data information that indicates contents of the data whose data writing process is interrupted, identification information about the optical disk, and written-data information that indicates contents of the data written on the optical disk;

storing the interrupted-data information, the identification information, the written-data information and the interrupted location, by relating the interrupted-data information, the identification information, the recorded-data information and the interrupted location to each other;

confirming that the optical disk, on which the data writing process is interrupted, is installed, based on said identification information, when resuming the data writing process;

interleaving the data corresponding to said interrupted-data information and said recorded-data information; and writing said data continuously from said interrupted location in the optical disk.

33. An information recording system, comprising:

an upper-level device outputting data that has a fixed unit length; and an information recording device writing the data outputted by said upper-level device in a recording medium, by dispersing and rearranging the data based on a fixed rule, wherein said information recording device includes:

an interrupted-location obtaining unit obtaining an interrupted location of the data written in the recording medium if a data writing process is interrupted;

an information obtaining unit obtaining interrupted-data information that indicates contents of the data whose data writing process is interrupted, identification information about the recording medium, and written-data information that indicates contents of the data written in the recording medium;

an information/location storing unit storing the interrupted-data information, the identification information, the written-data information and the interrupted location, by relating the interrupted-data information, the identification information, the recorded-data information and the interrupted location to each other;

a dispersing/rearranging unit confirming that the recording medium, on which the data writing process is interrupted, is installed, based on said identification information stored in said information/location storing unit, and dispersing and rearranging the data corresponding to the interrupted-data information and the recorded-data information stored in said information/location storing unit, when resuming the data writing process; and a data adding unit writing the data dispersed and rearranged by said dispersing/rearranging unit, continuously from said interrupted location in the recording medium.

34. An optical-disk recording system, comprising:

a computer outputting data that has a sector length; and an optical-disk recording device interleaving the data outputted by said computer, and, then, writing the data on an optical disk by emitting laser light onto the optical disk, wherein said optical-disk recording device includes:

an interrupted-location obtaining unit obtaining an interrupted location of the data written on the optical disk if a data writing process is interrupted;

an information obtaining unit obtaining interrupted-data information that indicates contents of the data whose data writing process is interrupted, identification information about the optical disk, and written-data information that indicates contents of the data written on the optical disk;

an information/location storing unit storing the interrupted-data information, the identification information, the written-data information and the interrupted location, by relating the interrupted-data information, the identification information, the recorded-data information and the interrupted location to each other;

an interleaving unit confirming that the optical disk, on which the data writing process is interrupted, is installed, based on said identification information stored in said information/location storing unit, and interleaving the data corresponding to the interrupted-data information and the recorded-data information stored in said information/location storing unit, when resuming the data writing process; and a data adding unit writing the data interleaved by said interleaving unit, continuously from said interrupted location in the optical disk.

* * * * *